US010939677B2

(12) United States Patent
Hu et al.

(10) Patent No.: US 10,939,677 B2
(45) Date of Patent: Mar. 9, 2021

(54) ANTIBACTERIAL CRYOGEL AND POROUS HYDROGEL, THEIR PREPARATION METHOD, AND THEIR USE FOR DISINFECTING WATER

(71) Applicant: NANYANG TECHNOLOGICAL UNIVERSITY, Singapore (SG)

(72) Inventors: Xiao Hu, Singapore (SG); Siew Leng Loo, Singapore (SG); Anthony G. Fane, Singapore (SG); Teik Thye Lim, Singapore (SG); William B. Krantz, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 14/897,803

(22) PCT Filed: Jun. 12, 2014

(86) PCT No.: PCT/SG2014/000273
§ 371 (c)(1),
(2) Date: Dec. 11, 2015

(87) PCT Pub. No.: WO2014/200435
PCT Pub. Date: Dec. 18, 2014

(65) Prior Publication Data
US 2016/0106093 A1    Apr. 21, 2016

Related U.S. Application Data

(60) Provisional application No. 61/834,052, filed on Jun. 12, 2013.

(51) Int. Cl.
| | | |
|---|---|---|
| *A01N 25/10* | (2006.01) | |
| *A01N 59/16* | (2006.01) | |
| *C02F 1/50* | (2006.01) | |
| *C02F 1/00* | (2006.01) | |
| *C02F 1/28* | (2006.01) | |

(52) U.S. Cl.
CPC .............. *A01N 25/10* (2013.01); *A01N 59/16* (2013.01); *C02F 1/002* (2013.01); *C02F 1/505* (2013.01); *B01D 2239/0442* (2013.01); *C02F 1/288* (2013.01); *C02F 2303/04* (2013.01)

(58) Field of Classification Search
CPC .............................. C02F 2303/04; A01N 25/10
See application file for complete search history.

(56) References Cited

U.S. PATENT DOCUMENTS

| | | | | |
|---|---|---|---|---|
| 2004/0258723 | A1* | 12/2004 | Singh | A61C 19/063 424/401 |
| 2007/0003603 | A1* | 1/2007 | Karandikar | A01N 59/16 424/443 |
| 2008/0132632 | A1* | 6/2008 | Schiraldi | C08K 9/08 524/445 |
| 2009/0252799 | A1* | 10/2009 | Hen | A61L 15/44 424/486 |
| 2011/0230567 | A1* | 9/2011 | Stromme | A61K 9/0014 514/772.3 |
| 2013/0105405 | A1* | 5/2013 | Bhattacharyya | C02F 1/705 210/742 |
| 2015/0125528 | A1* | 5/2015 | Langdo | C02F 1/688 424/484 |

FOREIGN PATENT DOCUMENTS

WO    WO-2013103846 A2 *   7/2013   ............... C02F 1/76

OTHER PUBLICATIONS

Thomas et al (Journal of Colloid and Interface Science, 2007, vol. 315, pp. 389-395).*
Bilici et al (Journal of Applied Polymer Science, 2010, vol. 118, pp. 2981-2988) (Year: 2010).*
Chern et al (Journal of Applied Polymer Science, 2004, vol. 92, pp. 3651-3658) (Year: 2004).*
Buchanan et al (Polymer Bulletin, 1986, vol. 15, pp. 325-332) (Year: 1986).*
Ahmed et al (Journal of Applied Polymer Science, 2010, vol. 117, pp. 2168-2174) (Year: 2010).*
Zielinska et al (Procedia Chemistry, 2009, pp. 1560-1566) (Year: 2009).*
Alonso, A. et al., *Environmentally-Safe Bimetallic Ag@Co Magnetic Nanocomposites With Antimicrobial Activity*, Chem. Commun. 47 (2011) 10464-10466.
Alonso, A. et al., *Superparamagnetic Ag@Co-Nanocomposites on Granulated Cation Exchange Polymeric Matrices With Enhanced Antibacterial Activity for the Environmentally Safe Purification of Water*, Adv. Funct. Mater. 23 (2013) 2450-2458.
Apopei, D. F. et al., *Sorption Isotherms of Heavy Metal Ions Onto Semi-Interpentrating Polymer Network Cryogels Based on Polyarcylamide and Anionically Modified Potato Starch*, Ind. Eng. Chem. Res. 51 (2012) 10462-10471.
AshaRani, P. V. et al., *Cytotoxicity and Genotoxicity of Silver Nanoparticles in Human Cells*, ACS Nano, vol. 3, No. 2 (2009) 279-290.
Auffan, M. et al., *Towards a Definition of Inorganic Nanoparticles From an Environmental, Health and Safety Perspective*, Nature Nanotechnology, vol. 4 (2009) 634-641.
Dankovich, T. A. et al., *Bactericidal Paper Impregnated With Silver Nanoparticles for Point-of-Use Water Treatment*, Environ. Sci. Technol. 45 (2011) 1992-1998.
Dragan, E. S. et al., *Synthesis and Swelling Behavior of pH-Sensitive Semi-Interpenetrating Polymer Network Composite Hydrogels Based on Native and Modified Potatoes Starch as Potential Sorbent for Cationic Dyes*, Chemical Engineering Journal 178 (2011) 252-263.
Fabrega, J. et al., *Silver Nanoparticle Impact on Bacterial Growth: Effect of pH, Concentration, and Organic Matter*, Environ. Sci. Technol. 43 (2009) 7285-7290.
Falletta, E. et al., *Clusters of Poly(acrylates) and Silver Nanoparticles: Structure and Applications for Antimicrobial Fabrics*, J. Phys. Chem. C 112 (2008) 11758-11766.

(Continued)

*Primary Examiner* — Mark V Stevens
(74) *Attorney, Agent, or Firm* — Alston & Bird LLP

(57) ABSTRACT

The invention relates to an antibacterial cryogel, its preparation method, and its use for disinfecting water. The invention further relates to an antibacterial porous hydrogel.

10 Claims, 14 Drawing Sheets

(56) References Cited

OTHER PUBLICATIONS

Gangadharn, D. et al., *Polymeric Microspheres Containing Silver Nanoparticals as a Bactericidal Agent for Water Disinfection*, Water Research 44 (2010) 5481-5487.
Henglein, A., *Colloidal Silver Nanoparticles: Photochemical Preparation and Interaction With $O_2$, $CCl_4$, and Some Metal Ions*, Chem. Mater. 10 (1998) 444-450.
Holt, K. B. et al., *Interaction of Silver(I) Ions With the Respiratory Chain of Escherichia coli: An Electrochemical and Scanning Electrochemical Microscopy Study of the Antimicrobial Mechanism of Micromolar Ag*, Biochemistry 44 (2005) 13214-13223.
Jain, P. et al., *Potential of Silver Nanoparticle-Coated Polyurethane Foam as an Antibacterial Water Filter*, Biotechnology and Bioengineering, vol. 90, No. 1 (2005) 59-63.
Kirsebom, H. et al., *Cryostructuration as a Tool for Preparing Highly Porous Polymer Materials*, Polym. Chem. 2 (2011) 1059-1062.
Kittler, S. et al., *Toxicity of Silver Nanoparticles Increases During Storage Because of Slow Dissolution Under Release of Silver Ions*, Chem. Mater. 22 (2010) 4548-4554.
Lee, W-F et al., *Swelling and Antibacterial Properties for the Superabsorbent Hydrogels Containing Silver Nanoparticles*, Journal of Applied Polymer Science, vol. 106 (2007) 1992-1999.
Li, D. et al., *Stimuli-Responsive Polymer Hydrogels as a New Class of Draw Agent for Forward Osmosis Desalination*, Chem. Commun. 47 (2011) 1710-1712.
Li, Q. et al., *Antimicrobial Nanomaterials for Water Disinfection and Microbial Control: Potential Applications and Implications*, Water Research 42 (2008) 4591-4602.
Liang, Y. N. et al., *$CuO_x$ Nanotubes Via an Unusual Complexation Induced Block Copolymer-Like Self-Assembly of Poly(acrylic acid)*, RSC Adv. 2 (2012) 9531-9537.
Lin, S. et al., *Silver Nanoparticle-Alginate Composite Beads for Point-of-Use Drinking Water Disinfection*, Water Research 47 (2013) 3959-3965.
Liu, J. et al., *Controlled Release of Biologically Active Silver From Nanosilver Surfaces*, ACS Nano, vol. 4, No. 11 (2010) 6903-6913.
Liu, J. et al., *Ion Release Kinetics and Particle Persistence in Aqueous Nano-Silver Colloids*, Environ. Sci. Technol. 44 (2010) 2169-2175.
Lok, C-N et al., *Silver Nanoparticles: Partial Oxidation and Antibacterial Activities*, J. Bio. Inorg. Chem. 12 (2007) 527-534.
Loo, S-L et al., *Design and Synthesis of Ice-Templated PSA Cryogels for Water Purification: Towards Tailored Morphology and Properties*, Soft Matter 9 (2013) 224-234.
Loo, S-L et al., *Emergency Water Supply: A Review of Potential Technologies and Selection Criteria*, Water Research 46 (2012) 3125-3151.
Loo, S-L et al., *Superabsorbent Cryogels Decorated With Silver Nanoparticles as a Novel Water Technology for Point-of-Use Disinfection*, Environ. Sci. Technol. 47 (2013) 9363-9371.
Mohan, Y. M. et al., *Controlling of Silver Nanoparticles Structure by Hydrogel Networks*, Journal of Colloid and Interface Science 342 (2010) 73-82.
Mohan, Y. M. et al., *Fabrication of Silver Nanoparticles in Hydrogel Networks*, Macromol. Rapid Commun. 27 (2006) 1346-1354.
Mohan, Y. M. et al., *Hydrogel Networks as Nanoreactors: A Novel Approach to Silver Nanoparticles for Antibacterial Applications*, Polymer 48 (2007) 158-164.
Morones, J. R. et al., *The Bactericidal Effect of Silver Nanoparticles*, Nanotechnology 16 (2005) 2346-2353.
Navarro, E. et al., *Toxicity of Silver Nanoparticles to Chlamydomonas Reinhardtii*, Environ. Sci. Technol. 42 (2008) 8959-8964.
Önnby, L. et al., *Polymer Composite Adsorbents Using Particles of Molecularly Imprinted Polymers or Aluminium Oxide Nanoparticles for Treatment of Arsenic Contaminated Waters*, Water Research 46 (2012) 4111-4120.
Oyanedel-Craver, V. A. et al., *Sustainable Colloidal-Silver-Impregnated Ceramic Filter for Point-of-Use Water Treatment*, Environ. Sci. Technol. 42 (2008) 927-933.
Pal. S. et al., *Does the Antibacterial Activity of Silver Nanoparticles Depend on the Shape of the Nanoparticle? A Study of the Gram-Negative Bacterium Escherichia coli*, Applied and Environmental Microbiology, vol. 73, No. 6 (2007) 1712-1720.
Park, S. et al., *Preparation of Silver Nanoparticle-Containing Semi-Interpentrating Network Hydrogels Composed of Pluronic and Poly(acrylamide) With Antibacterial Property*, Journal of Industrial and Engineering Chemistry 17 (2011) 293-297.
Rai, M. et al., *Silver Nanoparticles as a New Generation Antimicrobials*, Biology Advances 27 (2009) 76-83.
Savina, I. N. et al., *High Efficiency Removal of Dissolved As(III) Using Iron Nanoparticle-Embedded Macroporous Polymer Composites*, Journal of Hazardous Materials 192 (2011) 1002-1008.
Shannon, M. A. et al., *Science and Technology for Water Purification in the Coming Decades*, Nature, vol. 452 (2008) 301-310.
Sobsey, M. D. et al., *Point of Use Household Drinking Water Filtration: A Pratical, Effective Solution for Providing Sustained Access to Safe Drinking Water in the Developing World*, Environ. Sci. Technol. 42 (2008) 4261-4267.
Sondi, I. et al., *Silver Nanoparticles as Antimicrobial Agent: A Case Study on E. Coli as a Model for Gram-Negative Bacteria*, Journal of Colloid and Interface Science 275 (2004) 177-182.
Wang, X. et al., *Highly Stable Heterostructured $Ag$—$AgBr/TiO_2$ Composite: A Bifunctional Visible-Light Active Photocatalyst for Destruction of Ibuprofen and Bacteria*, J. Mater. Chem., 22 (2012) 23149-23158.
Wigginton, N. S. et al., *Binding of Silver Nanoparticles to Bacterial Proteins Depends on Surface Modifications and Inhibits Enzymatic Activity*, Environ. Sci. Technol. 44 (2010) 2163-2168.
Xia, B. et al., *Preparation of Hybrid Hydrogels Containing Ag Nanoparticles by a Green In Situ Reduction Method*, Langmuir 28 (2012) 11188-11194.
Xiu, Z-M et al., *Negligible Particle-Specific Antibacterial Activity of Silver Nanoparticles*, Nano Lett. 12 (2012) 4271-4275.
Yoon, K. Y. et al., *Antimicrobial Effect of Silver Particles on Bacterial Contamination of Activated Carbon Fibers*, Environ. Sci. Technol. 42 (2008) 1251-1255.
Yoon, K-Y et al., *Susceptibility Constants of Escherichia coli and Bacillus subtilis to Silver and Copper Nanoparticles*, Science of the Total Environment 373 (2007) 572-575.
Zargar, B. et al., *Colorimetric Determination of Resorcinol Based on Localized Surface Plasmon Resonance of Silver Nanoparticles*, Analyst 137 (2012) 5334-5338.
*Combating Waterborne Disease at the Household Level, The International Network to Promote Household Water Treastment and Safe Storage*, The Network, World Health Organization (2007) 35 pages.
International Search Report and Written Opinion for International Application No. PCT/SG2014/000273 dated Jul. 22, 2014.

* cited by examiner

FIG. 2

Table 1 Nomenclature and summary of PSA/Ag cryogel properties

| Sample | Precursor $Ag^+$ (M) | Ag content (mg g$^{-1}$) | Water recovery efficiency [b] (%) | Young's modulus[c] (kPa) | Mean AgNPssi ze[e] (nm) | Mean Ag crystallite size[f] (nm) | Total Ag loss after 24 h[g] (%) | Total Ag in squeezed water (μg L$^{-1}$) |
|---|---|---|---|---|---|---|---|---|
| PSA gel | N.A. | N.A. | 84.8 (1.0) | 2.6 (0.5)[d] | N.A. | N.A. | N.A. | N.A. |
| AgNC-20 | 0.001 | 21.3 (0.3) | 85.6 (0.8) | 3.0[d] | 4.3 (1.3) | 3.8 | 1.79 (0.02) | 76.6 (0.7) |
| AgNC-90 | 0.005 | 88.7 (12.3) | 84.3 (1.5) | 3.2 (0.4)[d] | 6.2 (1.7) | 5.5 | 0.08 | 59.6 (0.8) |
| AgNC-170 | 0.010 | 166.7 (15.0) | 84.5 (2.3) | 3.2 (0.4)[d] | 8.6 (3.8) | 7.8 | 0.03 | 36.4 (1.5) |

Note: N.A. = not applicable; standard deviations are shown in parentheses.

[a] The equilibrium swelling degree was computed by taking the ratio of swollen mass to that of dried mass of cryogel.

[b] The water recovery efficiency of cryogel was computed by taking the ratio of the difference between swollen and deswollen cryogel masses to the difference between swollen and dried cryogel masses.

[c] The Young's modulus was determined from the initial linear slopes of the stress-strain curves.

[d] No failure was observed at the end of the uniaxial compression test.

[e] Determined from TEM images.

[f] Estimated from X-ray diffractograms using Scherrer equation; full-width-at-half maximum of (111) reflection and a shape factor of 0.9 were used for computation.

[g] Expressed as a percentage of total Ag in the initial PSA/Ag cryogel.

FIG. 5
(a)
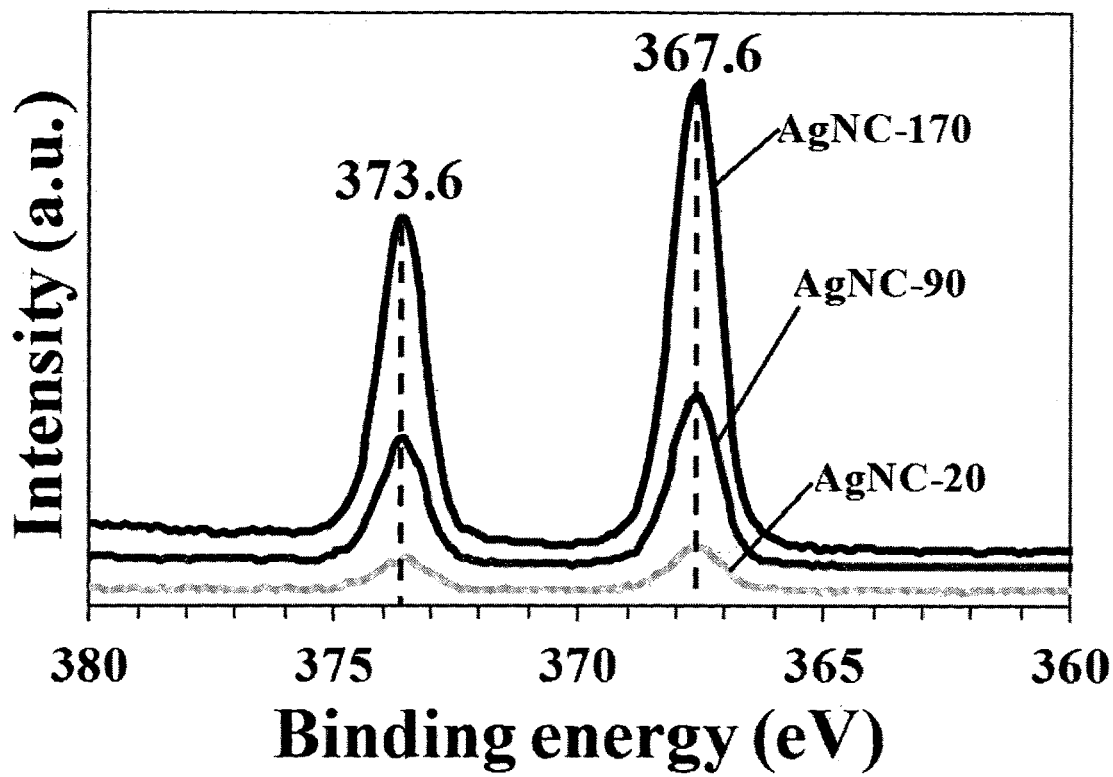
(b)
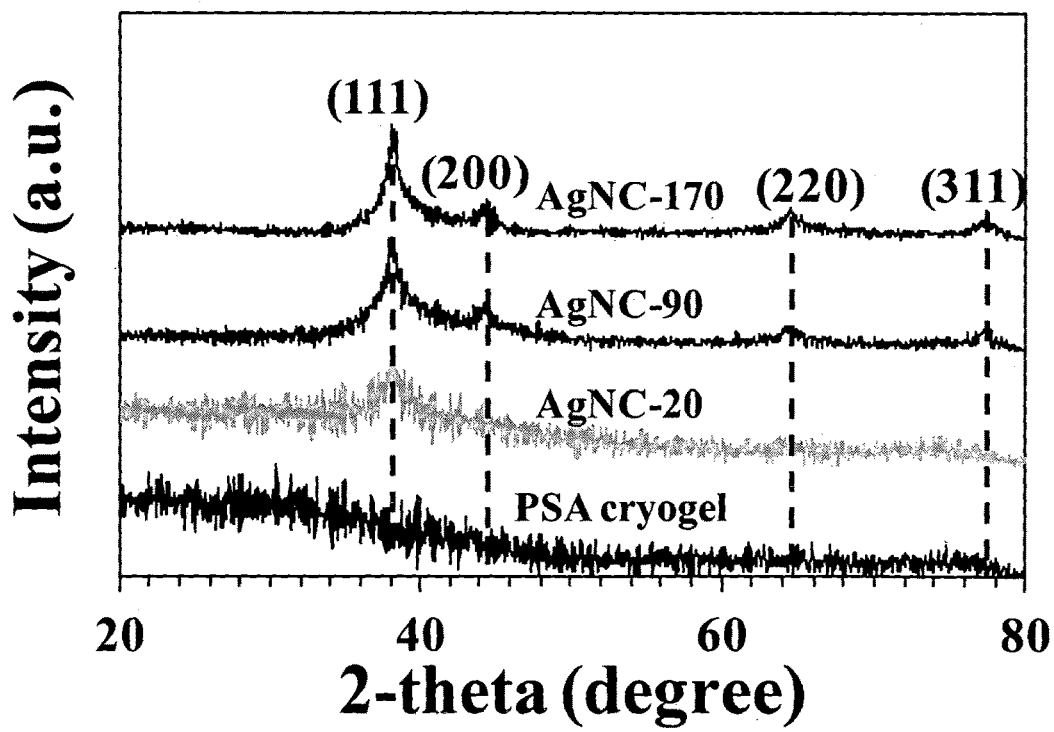

FIG. 5 (continued)
(c)
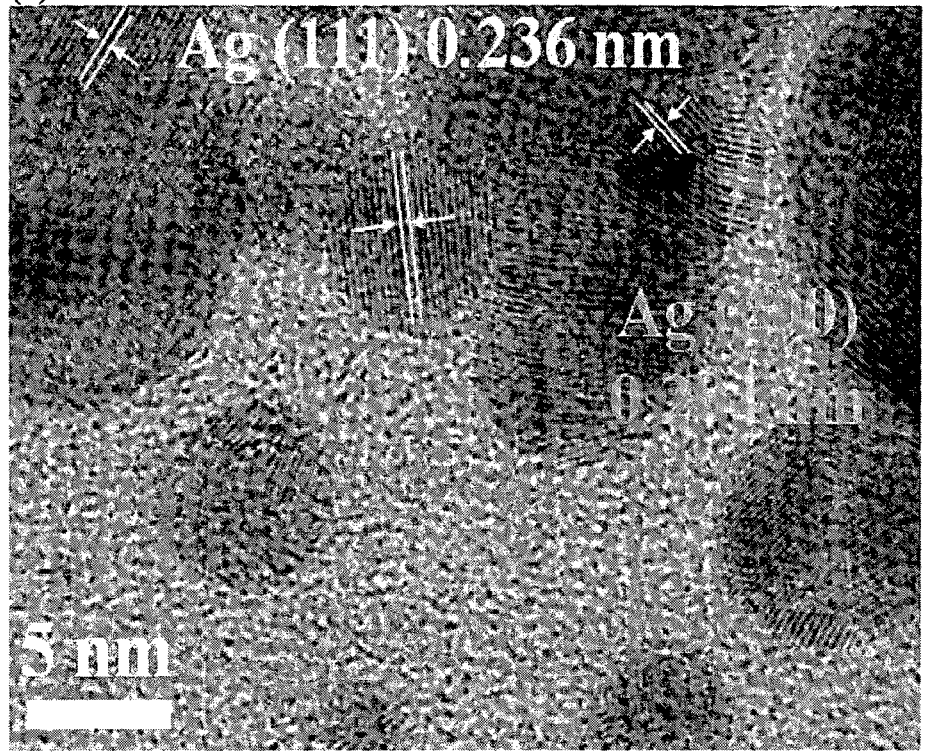
(d)
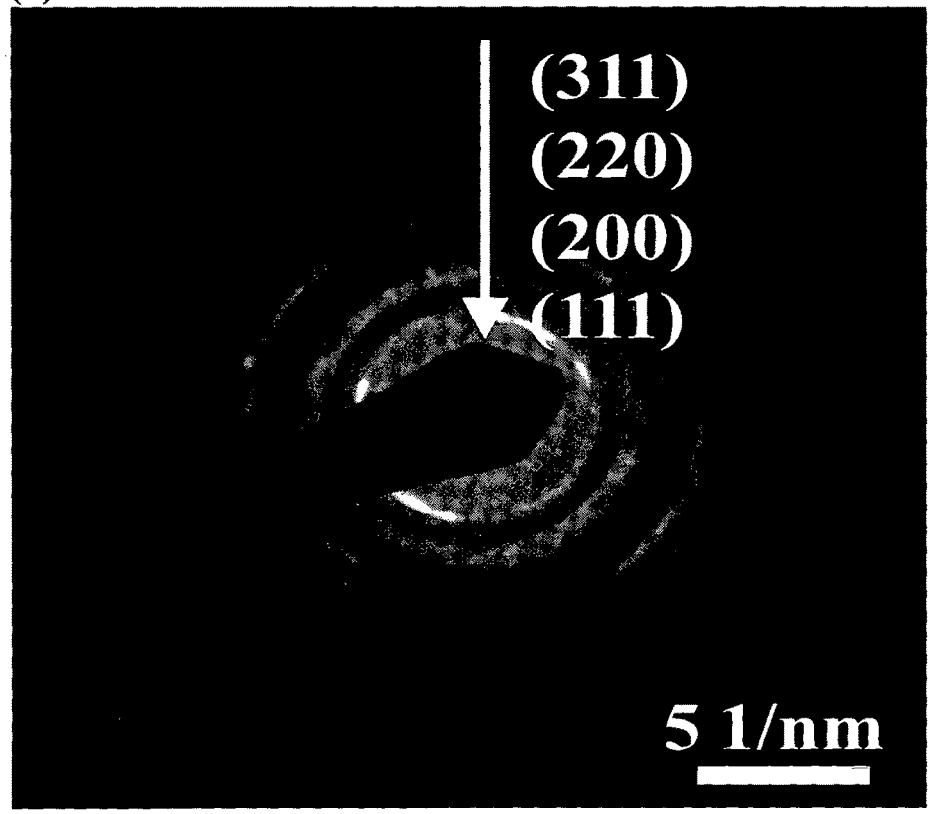

FIG. 9
(a)
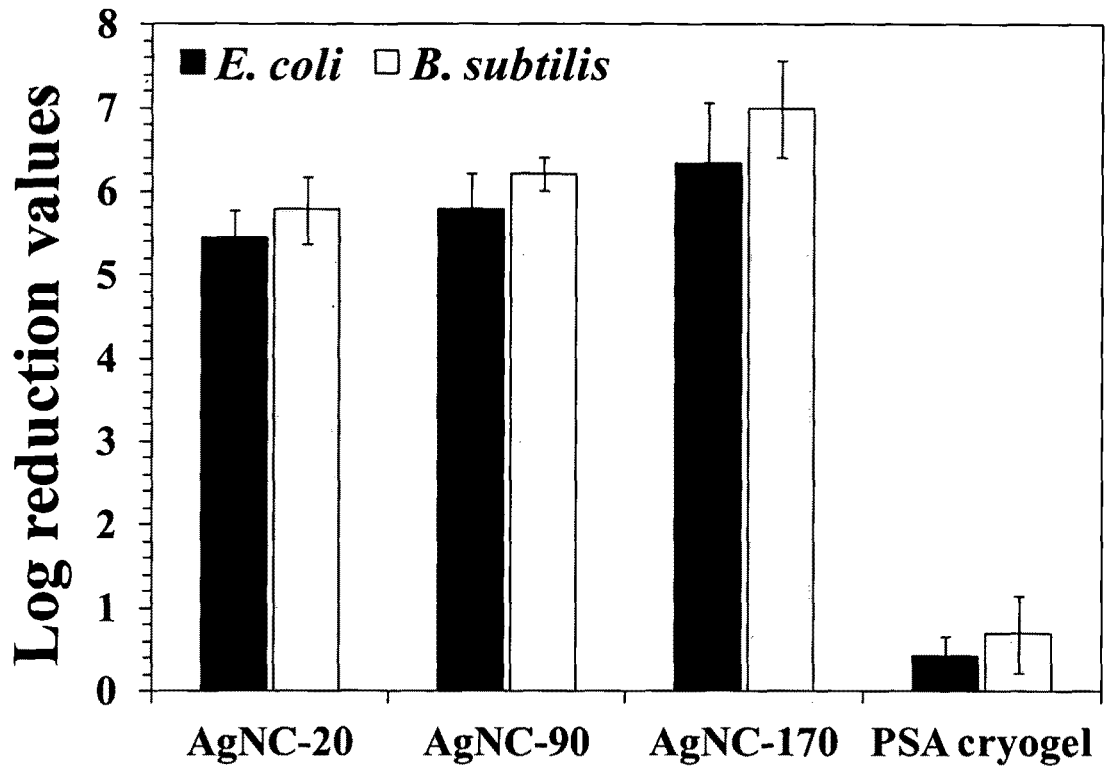
(b)
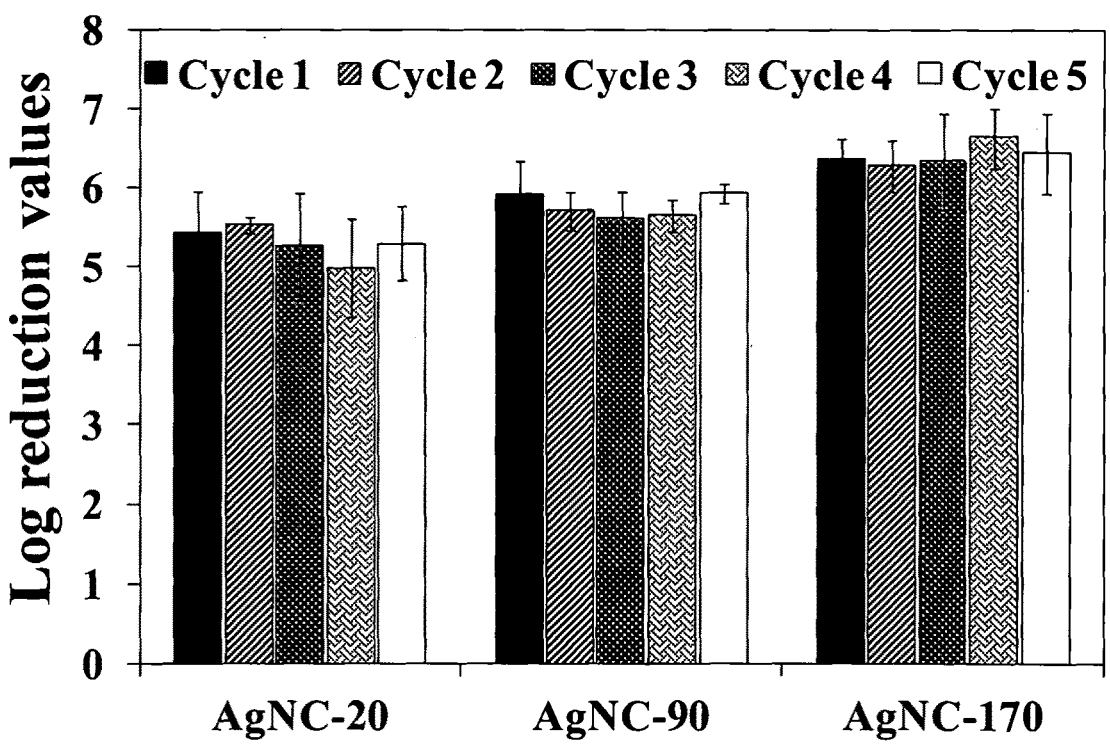

FIG. 9 (continued)
(c)
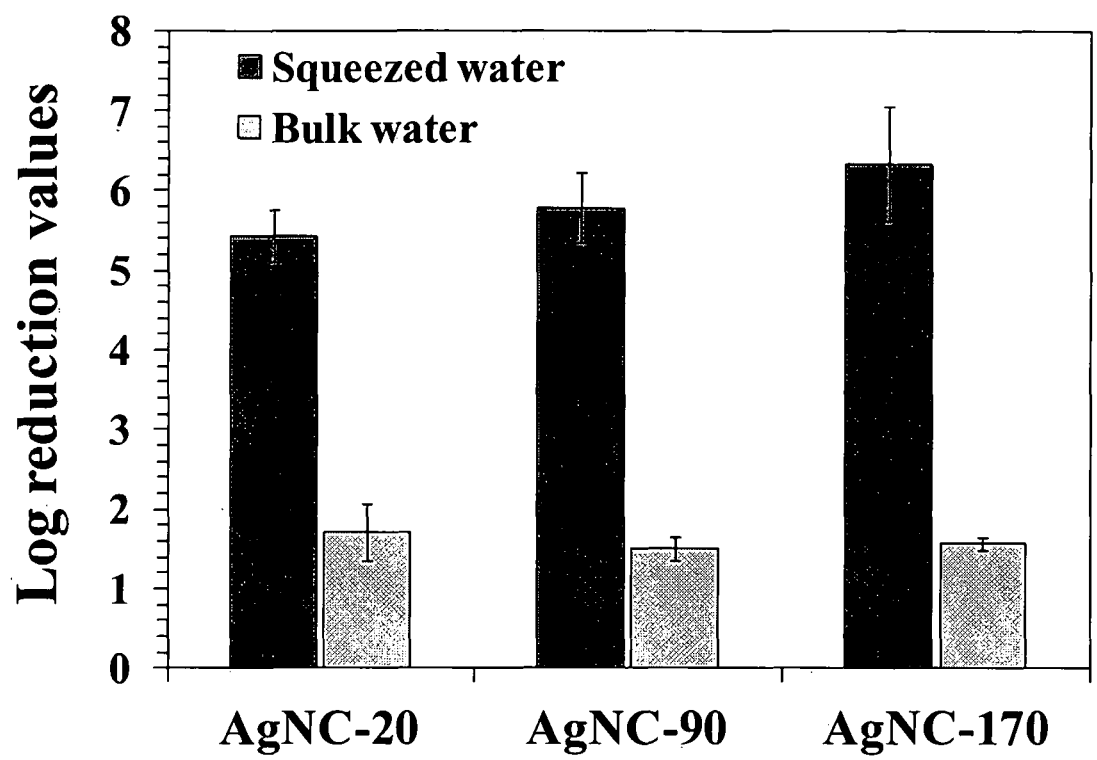
(d)
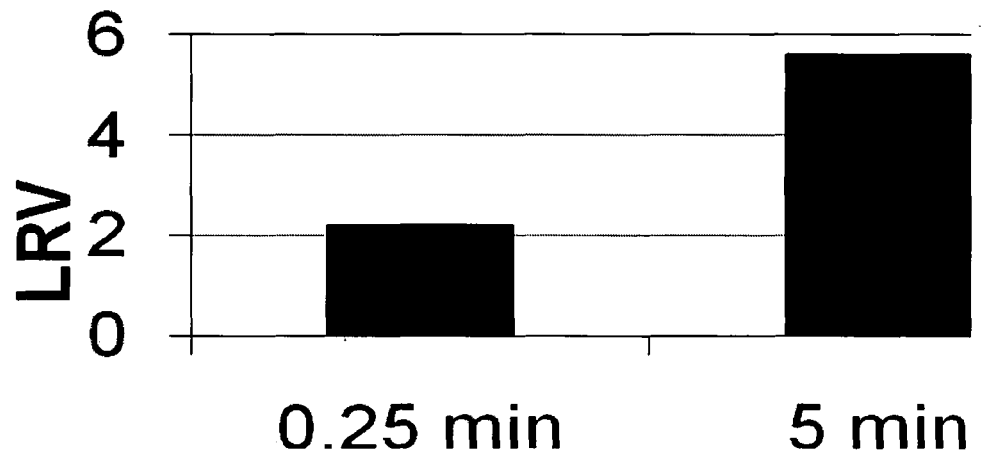

FIG. 12
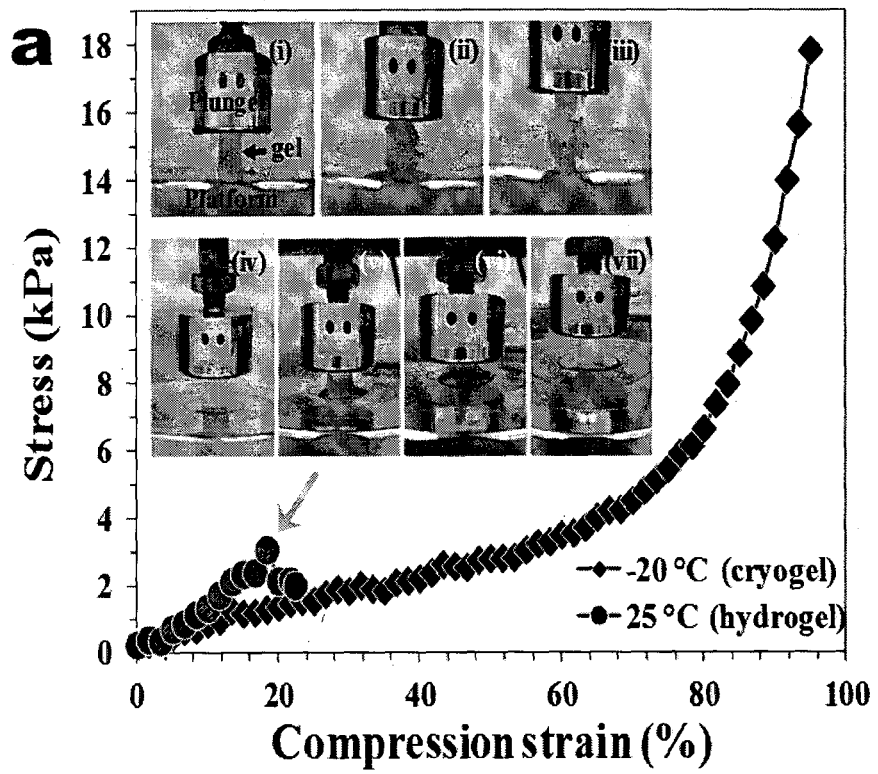
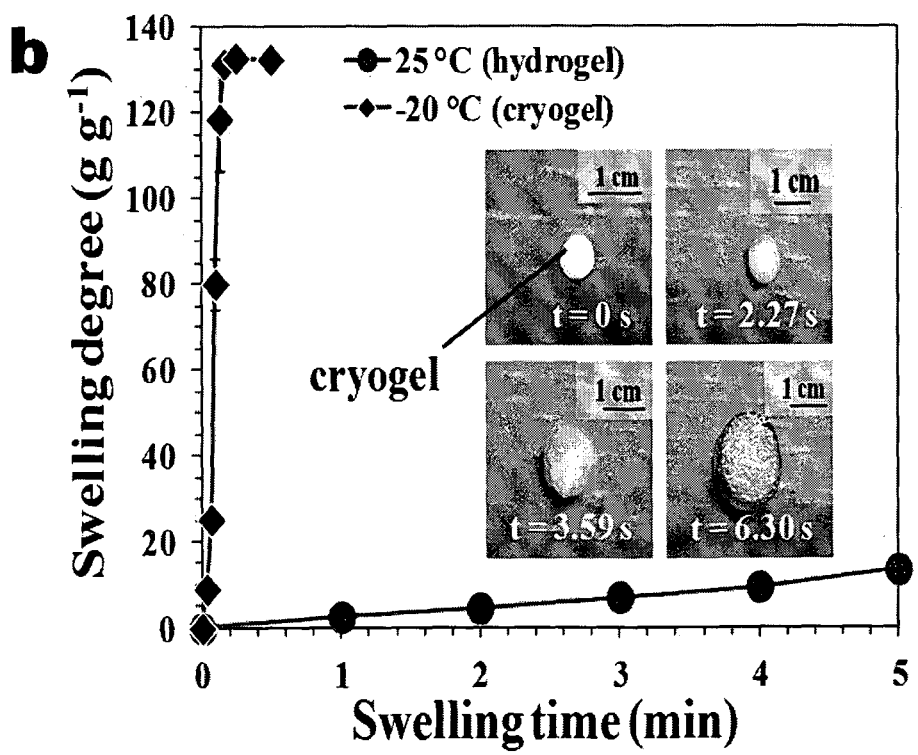

ANTIBACTERIAL CRYOGEL AND POROUS HYDROGEL, THEIR PREPARATION METHOD, AND THEIR USE FOR DISINFECTING WATER

CROSS-REFERENCE TO RELATED APPLICATION

This application claims the benefit of priority of U.S. Provisional Patent Application No. 61/834,052, filed Jun. 12, 2013, the contents of which being hereby incorporated by reference in its entirety for all purposes.

TECHNICAL FIELD

The invention relates to an antibacterial cryogel, its preparation method, and its use for disinfecting water. The invention further relates to an antibacterial porous hydrogel.

BACKGROUND

Microbiological contamination of potable water sources is one of the major threats to public health. About 1.8 million people, most of whom are children, die annually from diarrheal diseases. Diarrheal disease risks could be reduced by improving microbiological water quality at the point-of-use (POU). However, conventional disinfection methods are limited by their effectiveness and/or formation of harmful disinfection byproducts (DBPs). In addition, the emergence of microorganisms that are resistant to multiple antimicrobial agents calls for development of improved disinfection methods that minimizes DBP formation.

Nanoscale materials have received increasing interest as alternative disinfectants due to their high interfacial reactivity and unique physicochemical properties. In particular, silver (Ag) nanoparticles (AgNPs) have been shown to have excellent antimicrobial properties towards a variety of microorganisms. Despite this, practical applications of free AgNPs are still limited due to issues related to dispersion and dissolution that may result in loss of their effectiveness and potential (eco)toxicological impacts. These issues can be addressed by stabilizing AgNPs in various inorganic/organic support materials.

The application of AgNPs-functionalized ceramic filters, hydrogels, ion-exchange materials, papers, polyurethane foam, and polymeric spheres as bioactive components in flow-through or column systems for point-of-use water disinfection have been tested. These studies have demonstrated the effectiveness of Ag nanocomposites in terms of bacterial deactivation but little attention was given to elucidate their bactericidal mechanisms. In addition, their applications may be limited by either (i) a relatively low output of disinfected water or (ii) a significant level of Ag release into the treated water that compromised the potability of water and the reusability of the nanocomposites. Furthermore, systems operated in the column mode may present some operational challenges especially when deployed for applications in difficult circumstances such as in the aftermath of disasters.

Accordingly, there is a need to provide for an improved method of disinfecting water for point-of-use applications.

SUMMARY

It is herein disclosed the preparation of antibacterial agent-decorated cryogels, such as but not limited to, silver (Ag) nanoparticles (AgNPs)-decorated cryogels, and their application for water disinfection in point-of-use processes that capitalizes on the ability of such cryogels to absorb water for disinfection, which disinfected water can subsequently be released via external stimuli. Cryogels are formed by conducting a polymerization reaction in a semi-frozen system in which the ice crystals (for aqueous systems) act as the porogens, resulting in a highly interconnected porous network. The design of present AgNPs-decorated cryogels combines the advantages of high porosity, excellent mechanical and water absorption properties of cryogels, and uniform dispersion of fine AgNPs on the cryogel pore surface for rapid disinfection with minimal Ag release. Present AgNPs-decorated cryogels are lightweight and permit easy recovery of the absorbed (i.e. disinfected) water via the application of minimal pressure, e.g. by manual hand compression. Due to their simple operation and ease of deployment, presently disclosed AgNPs-decorated cryogels offer great promise to provide potable water especially in emergencies where there is limited access to the infrastructure.

Thus, in a first aspect of the invention, there is provided an antibacterial cryogel. The antibacterial cryogel includes a polymeric cryogel matrix. The antibacterial cryogel further includes an antibacterial agent incorporated into pores of the polymeric cryogel matrix.

In preferred embodiments, the antibacterial agent may comprise or consist of silver (Ag) or silver ions (Ag$^+$) nanoparticles.

In a second aspect of the invention, a method of preparing an antibacterial cryogel is disclosed. The method includes immersing a cryogel in a first solution comprising a precursor of an antibacterial agent to form a modified cryogel. The modified cryogel includes a polymeric cryogel matrix. The modified cryogel further includes the precursor of the antibacterial agent incorporated into pores of the polymeric cryogel matrix. The method further includes removing the modified cryogel from the first solution and immersing the modified cryogel in a second solution. The second solution includes a reducing agent to reduce the precursor of the antibacterial agent to an antibacterial agent.

In a third aspect of the invention, there is described a method of disinfecting drinking water for point-of-use application. The method includes immersing an antibacterial cryogel presently disclosed in contaminated water to allow the antibacterial cryogel to swell and squeezing the swollen antibacterial cryogel to release water therefrom.

In a fourth aspect of the invention, there is provided an antibacterial porous hydrogel. The antibacterial porous hydrogel includes a porous polymeric hydrogel matrix. The antibacterial porous hydrogel further includes an antibacterial agent incorporated into pores of the porous polymeric hydrogel matrix.

In a fifth aspect of the invention, a method of preparing an antibacterial porous hydrogel is disclosed. The method includes immersing a porous hydrogel in a first solution comprising a precursor of an antibacterial agent to form a modified porous hydrogel. The modified porous hydrogel includes a porous polymeric hydrogel matrix. The modified porous hydrogel further includes the precursor of the antibacterial agent incorporated into pores of the porous polymeric hydrogel matrix. The method further includes removing the modified porous hydrogel from the first solution and immersing the modified porous hydrogel in a second solution. The second solution includes a reducing agent to reduce the precursor of the antibacterial agent to an antibacterial agent. During polymerization of initial monomers to form the porous hydrogel, pore forming agents (i.e.

porosigens) are introduced and subsequently removed such that pores are formed in the polymeric hydrogel matrix, thereby forming a porous hydrogel.

In a sixth aspect of the invention, there is described a method of disinfecting drinking water for point-of-use application. The method includes immersing an antibacterial porous hydrogel presently disclosed in contaminated water to allow the antibacterial porous hydrogel to swell and squeezing the swollen antibacterial porous hydrogel to release water therefrom.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

FIG. 2 shows a table of nomenclature and summary of PSA/Ag cryogel properties (Table 1).

FIG. 5 shows (a) XPS and (b) XRD spectra of PSA cryogels with different Ag loadings, (c) HRTEM image and (d) SAED pattern of AgNC-170.

FIG. 9 shows (a) bacterial log reduction values (LRV) of nanocomposites; (b) reusability of PSA/Ag over five cycles of operation; (c) comparison of the disinfection efficacies in the squeezed and bulk waters; and (d) LRV versus the incubation (waiting) time after the water is being squeezed out of the cryogel indicting there is a delay of biocidal effect. However it is clear that the water absorbed in 15 s and squeezed out in 1 s can reach >5 Log after less than 5 min incubation.

FIG. 12 shows: (a) dynamic swelling profiles of PSA hydrogels and cryogels. The inset shows the time-dependent swelling of a typical PSA cryogel; (b) a comparison of the mechanical properties of PSA hydrogels (inset: i-iii) and cryogels (inset: iv-vii). The arrow shows the point at which the hydrogel started to fail/disintegrate.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, chemical, and material changes may be made without departing from the scope of the invention. The various embodiments are not necessarily mutually exclusive, as some embodiments can be combined with one or more other embodiments to form new embodiments.

Providing drinking water to the affected population is among the top priorities after the occurrence of natural disasters. In light of the increasing frequency and intensity of global natural disasters, there is immense interest in developing compact and easily deployable emergency water technology with simple and relatively low-energy operation to cater to this need.

Present disclosure introduces a novel approach of disinfecting drinking water using cryogel membranes in the event of an emergency.

Accordingly, in a first aspect of the disclosure, there is provided an antibacterial cryogel.

As described above, cryogels are formed by conducting a polymerization reaction in a semi-frozen system in which the ice crystals (for aqueous systems) act as the porogens, resulting in a highly interconnected porous polymer network or matrix. This is in contrast to hydrogels which are formed at higher temperatures, such as 5° C. or above, i.e. not in a semi-frozen aqueous system. Briefly, a hydrogel refers to a polymeric soft matter that is or can be swollen with water. Cryogels belong to a special class of gel-like polymers that are prepared below freezing point of the solvent (e.g. water). Such special process renders the cryogels their characteristic macroporous structures and other unique attributes including mechanical properties and water absorption/releasing behaviour desirable for the present application. For example, in embodiments using poly(sodium acrylate) (PSA) as the polymeric matrix, PSA hydrogels and PSA/Ag hydrogels were prepared using the same reagents and formulation as the PSA cryogels except that the gelation was conducted at room temperature (freezing is required for cryogels, hence the word "cryo").

Figure 11:
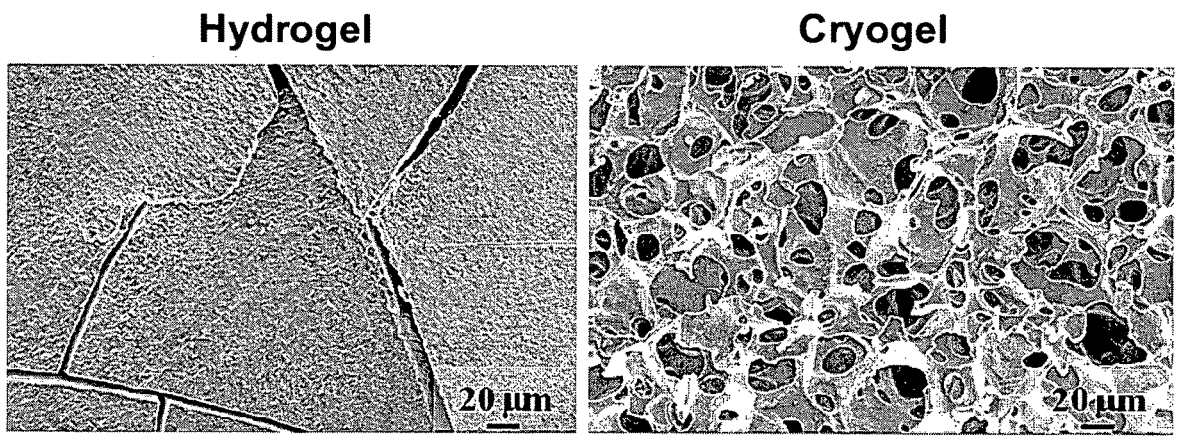
FIG. 11 shows SEM images showing the differences in the morphologies of PSA hydrogel and PSA cryogel.

FIG. 11 shows the comparison of the morphology between a PSA hydrogel and a PSA cryogel. Evidently, the SEM images show that the PSA hydrogel is essentially non-porous in contrast to the case of the highly porous PSA cryogel. It can be readily seen that the cracks observed in the SEM image of the PSA hydrogel developed during the washing step because the PSA hydrogel could not withstand the swelling pressure. As a result of the well-interconnected porous network of cryogels, they display drastically improved swelling and mechanical properties. For example, PSA cryogels reached their equilibrium degree of swelling within 15 s while the PSA hydrogels took about 30-90 min (FIG. 12(a)). In addition, the stress-strain curve in FIG. 12(b) shows the typical elastic behavior of a PSA cryogel in contrast to a weak and fragile hydrogel. Digital photographs of a PSA hydrogel and cryogel during compression tests provide a visual comparison of their mechanical properties. The PSA hydrogel was completely broken when compressed to 18% strain (FIG. 12(b), inset: i-iii). In contrast, the PSA cryogel did not show any crack development after being compressed to 95% strain (accompanied by a loss of water or deswelling) and re-swelled to its original shape after relieving the pressure (FIG. 12(b), inset: iv-vii).

In the study by Lee et al. (*J Appl Pol Sci* 2007, 106(3): 1992-1999), various types of hydrogels, i.e. poly(sodium acrylate), poly(sodium acrylate-co-1-vinyl-2-pyrrolidone), incorporated with silver nanoparticles as bactericidal agent were prepared. Although their gels were found to have a high swelling degree (1016 g/g), but none of absorbed water can be recovered by squeezing because the absorbed water is strongly bound to the polymeric chains. Note that it has been shown that a pressure of 3 MPa could only recover about 5% of the water absorbed by a PSA hydrogels (Li et al. *Chem. Comm.* 2011, 47: 1710-1712). On the other hand, for presently disclosed cryogels, up to 85% of the absorbed water could be recovered with a pressure of 70 kPa. One possible problem with the high-swelling hydrogels might be that they break into pieces when allowed to swell in water for too long (>30 min) that therefore renders recovery of absorbed water for subsequent uses difficult.

Figure 13:
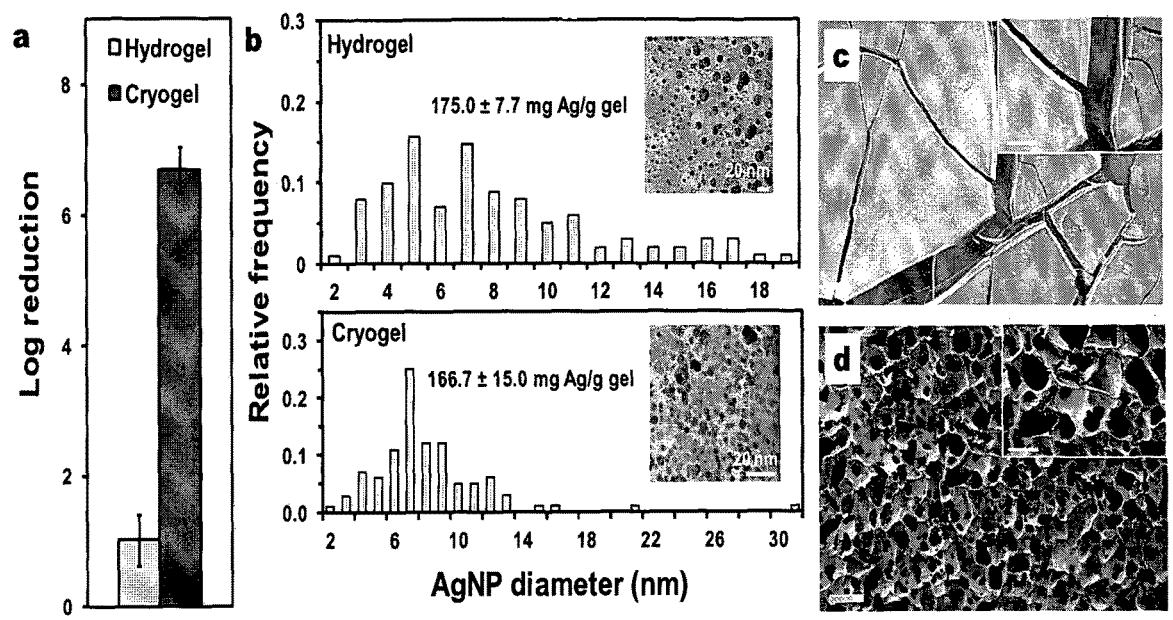
FIG. 13 shows: (a) comparison of the disinfection efficacies of PSA/Ag cryogel versus hydrogel; (b) AgNP-size distribution for PSA/Ag cryogel (bottom) and hydrogel (top); the insets show the typical images used for analyses. Note that the average AgNP sizes were 8.4±3.8 nm and 8.6±3.8 nm, respectively. SEM images of PSA/Ag (c) hydrogel and (d) cryogel; the scale bar denotes 100 μm length.

The study by Lee et al. also found that the hydrogel nanocomposites were antibacterial. Specifically, their best-performing gel, namely SV-Ag10 (10 ppm Ag) could only achieve 90% bacterial inactivation in 2 h (without addition of quenching agent). In contrast, presently disclosed cryogels were found to inactivate 99.9% bacteria in 15 s (with the addition of quenching agent), a significant enhancement in the disinfection efficacy compared to the study by Lee et al. Additional tests were also conducted to compare the disinfection efficacies of PSA/Ag cryogels versus hydrogels. In contrast to cryogels, hydrogel having similar AgNP content (170 mg/g) and size did not cause any substantial disinfection after a 5-min contact time (FIG. 13). The low antibacterial activity of the PSA/Ag hydrogel might be because a substantial number of AgNPs impregnated in the free volumes (nanopores) are inaccessible by the bacterial cells thereby limiting contact-killing.

In other words, the antibacterial cryogel includes a polymeric cryogel matrix. Cryogels are robust and lightweight materials capable of absorbing a large amount of water that subsequently can be recovered by a change in external stimuli such as pressure, temperature, pH, light, or potential field. As such, they offer huge promise in providing potable water for emergency drinking water response.

In present disclosure, cryogels are functionalized with antibacterial agents (alternatively, disinfectants) such as, without limitation, silver or silver ions nanoparticles to impart antibacterial properties while simultaneously removing particulates from water. This is achieved whereby the antibacterial cryogel includes an antibacterial agent incorporated into pores of the polymeric cryogel matrix.

In its broadest definition, an antibacterial agent (or simply an antibacterial) is a synthetic agent that interferes with the growth and reproduction of bacteria. Antibacterials are now most commonly described as agents used to disinfect substances or surfaces, and eliminate potentially harmful bacteria. In present context, suitable antibacterial agents for disinfecting water for drinking purposes may include, but not limited to, metals or metal ions such as silver (Ag) or silver ions ($Ag^+$). In preferred embodiments, the antibacterial agents are nanoparticles such as silver or silver ions nanoparticles (AgNPs for short). The Ag and $Ag^+$ nanoparticles may be collectively terms as bioactive Ag species. While the present disclosure and illustrations relate predominantly to Ag and $Ag^+$ nanoparticles as a suitable antibacterial agent, it is to be understood and appreciated that the scope of is not limited to such embodiments. For example, other antibacterial agents include metal nanoparticles such as copper nanoparticles, or metal oxide nanoparticles such as titanium dioxide, zinc oxide, copper (II) oxide nanoparticles. Additional suitable antibacterial agents include organic compounds or monomers such as, without limitation, sulfobetaine methacrylate, certain peptides, proteins or polypeptides. Functionalization using organic compounds or monomers can be attained via different means, e.g. blending, grafting, or copolymerization.

In certain embodiments where the antibacterial agents are the bioactive Ag species, it is envisaged that the water-absorbing cryogels bring water and bioactive Ag species into close proximity for disinfection to take effect within the micron-sized pore spaces in the polymeric cryogel matrix, which are densely decorated with AgNPs. On this note, disinfection may occur via three mechanisms as discussed in more details in later paragraphs.

In various embodiments, the polymeric cryogel matrix of the antibacterial cryogel may be formed by a co-polymerization reaction. For example, the polymeric cryogel matrix may comprise or consist of an acrylic polymer or copolymer, preferably poly(sodium acrylate) (PSA for short). PSA cryogels may be synthesized by conducting a co-polymerization reaction between sodium acrylate and N,N'-methylenebisacrylamide at $-20°$ C. (see the Example section for synthesis details). Further examples of cryogel materials include, without limitation, other acrylic-based high-swelling monomers such as acrylamide and hydroxyethylmethacrylate. The solvent used for the synthesis is not limited to water that includes but not limited to other organic solvent (or mixtures) such as acetone, ethanol, dimethyl sulfoxide, and formamide at which the synthesis is conducted at a sufficiently low temperature to freeze the solvents.

A method of preparing an antibacterial cryogel will next be described. Incorporation of an antibacterial agent into polymeric cryogel matrix of a cryogel may be carried via intermatrix synthesis route. Accordingly, the method includes immersing a cryogel in a first solution comprising a precursor of an antibacterial agent to form a modified cryogel. The modified cryogel comprises a polymeric cryogel matrix. The modified cryogel further comprises the precursor of the antibacterial agent incorporated into pores of the polymeric cryogel matrix.

The method further includes removing the modified cryogel from the first solution and immersing the modified cryogel in a second solution comprising a reducing agent to reduce the precursor of the antibacterial agent to an antibacterial agent. In other words, the antibacterial agents are incorporated into the modified cryogel via in situ reduction of the precursor.

As described above, in various embodiments, the antibacterial agents are nanoparticles such as Ag or $Ag^+$ nanoparticles. Any Ag compounds having good water-solubility are suitable to be used as precursors. Examples of suitable precursors of the Ag or $Ag^+$ nanoparticles include, without limitation, silver nitrate, silver acetate, silver fluoride, and silver sulfate. In one embodiment, a suitable precursor of the Ag or $Ag^+$ nanoparticles may be silver nitrate ($AgNO_3$).

Accordingly, suitable reducing agents for reducing the precursor from $Ag^+$ to Ag may include, without limitation, sodium borohydride ($NaBH_4$), citric acid, hydrazine, or ascorbic acid.

Due to its ability to absorb water and swell significantly, as well as undergo several cycles of swelling and de-swelling by exerting an external stimuli, presently disclosed antibacterial cryogels find particular use in disinfecting contaminated water to produce potable water.

Accordingly, a method of disinfecting drinking water for point-of-use application is herein disclosed. The method includes immersing an antibacterial cryogel described herein in contaminated water to allow the antibacterial cryogel to swell.

Thereafter, the swollen antibacterial cryogel may be squeezed to release water therefrom, thereby producing disinfected water.

The antibacterial cryogel may be further dried for re-use since it is able to undergo several cycles of swelling and de-swelling process.

A further aspect of the invention relates to a method of preparing an antibacterial porous hydrogel.

As mentioned above, FIG. 11 shows SEM image of non-porous PSA hydrogel and cracks are observed in the SEM image of the PSA hydrogel which developed during the washing step because the non-porous PSA hydrogel could not withstand the swelling pressure.

To overcome this cracking phenomenon, porous hydrogels are deliberately formed. In various embodiments, porous hydrogels may be formed by introducing pore forming agents (i.e. porosigens) during polymerization of initial monomers to form the hydrogel. As the polymeric matrix of the hydrogel starts to form, the pore forming agents may subsequently be removed, thereby leaving pores or voids in the polymeric matrix. For example, the removal of the pore forming agents may include thawing, evaporation, or washing.

Additional embodiments may include forming the porous hydrogel by surface crosslinking individual hydrogel particles to form crosslinked aggregates of hydrogel particles, thereby forming pores between the hydrogel particles.

It is to be understood and appreciated that other methods of forming porous hydrogels are also suitable and apparent to persons skilled in the art.

The porous hydrogel is then immersed in a first solution comprising a precursor of an antibacterial agent to form a modified porous hydrogel. The modified porous hydrogel includes a porous polymeric hydrogel matrix. The modified porous hydrogel further includes the precursor of the antibacterial agent incorporated into pores of the porous polymeric hydrogel matrix. The method further includes removing the modified porous hydrogel from the first solution and immersing the modified porous hydrogel in a second solution. The second solution includes a reducing agent to reduce the precursor of the antibacterial agent to an antibacterial agent.

Another aspect of the invention relates to an antibacterial porous hydrogel. The antibacterial porous hydrogel includes a porous polymeric hydrogel matrix. The antibacterial porous hydrogel further includes an antibacterial agent incorporated into pores of the porous polymeric hydrogel matrix.

Similar to the antibacterial cryogel described above, the antibacterial porous hydrogel possesses ability to absorb water and swell significantly, as well as undergo several cycles of swelling and de-swelling by exerting an external stimuli. Hence, present antibacterial porous hydrogels also find particular use in disinfecting contaminated water to produce potable water.

In a sixth aspect of the invention, there is described a method of disinfecting drinking water for point-of-use application. The method includes immersing an antibacterial porous hydrogel presently disclosed in contaminated water to allow the antibacterial porous hydrogel to swell and squeezing the swollen antibacterial porous hydrogel to release water therefrom.

For brevity sake, the above description on suitable antibacterial agents, precursors, reducing agents, and polymeric matrix materials is applicable to the antibacterial porous hydrogel and is not repeated hereinafter.

In order that the invention may be readily understood and put into practical effect, particular embodiments will now be described by way of the following non-limiting examples.

EXAMPLES

In the following examples, preparation of poly(sodium acrylate) (PSA) cryogels decorated with silver nanoparticles (AgNPs) for point-of-use (POU) water disinfection is described. AgNPs were incorporated into PSA cryogels via in situ borohydride reduction of $Ag^+$. The PSA/Ag cryogels combine the high porosity, excellent mechanical and water absorption properties of cryogels, and uniform dispersion of fine AgNPs on the cryogel pore surface for rapid disinfection with minimal Ag release ($<100$ μg $L^{-1}$). They were used in a process that employed their ability to absorb water, which subsequently could be released via application of mild pressure. The antibacterial performance of PSA/Ag cryogels was evaluated based on the disinfection efficacies of *E. coli* and *B. subtilis*. The PSA/Ag cryogels had excellent disinfection efficacies showing more than a 5-log reduction of viable bacteria after a contact time of 15 s. They were highly reusable as there was no significant difference in the disinfection efficacies over five cycles of operation. The biocidal action of the PSA/Ag cryogels is believed to be dominated by surface-controlled mechanisms that are dependent on direct contact of the interface of PSA/Ag cryogels with the bacterial cells. The PSA/Ag cryogels therefore offer a simpler approach for drinking-water disinfection in disaster-relief applications.

Experimental

Preparation of Poly(Sodium Acrylate) (PSA) Cryogels

The design principles and synthesis of PSA cryogels were previously described (Loo, S.-L.; Krantz, W. B.; Lim, T.-T; Fane, A. G.; Hu, X. *Design and synthesis of ice-templated PSA cryogels for water purification: Towards tailored morphology and properties. Soft Matter* 2013, 9 (1), 224-234). Briefly, ammonium persulfate (APS, 98% purity, Sigma-Aldrich) and N,N,N',N'-tetramethylethylenediamine (TEMED, ≥99%, Sigma-Aldrich) were added to a reaction mixture, containing sodium acrylate (SA, 97%, Sigma-Aldrich) and N,N'-methylenebis(acrylamide) (MBA, 99%, Sigma-Aldrich), that was degassed and chilled in an ice bath. The APS and TEMED concentrations in the final reaction mixture were 1.75 mM and 0.125% (v/v), respectively. The monomer concentration (SA+MBA) used was 8% at a crosslinker ratio of 0.05 (mol MBA/mol SA). The resultant reaction mixture was transferred into several poly(propylene) syringes (3 mL and 9 mm ID) that were then placed into a bath fluid (−20° C., 1:1 mixture of ethylene glycol/MilliQ water (18.2 MΩ·cm at 25° C.)) incubated in an ultra-low temperature freezer (Eutra ED-FU4100). After 24 h, the PSA cryogels were thoroughly washed in MilliQ water and dehydrated in t-butanol followed by drying in a freeze-dryer (Alpha 1-4LD, −45° C.) before they were fractured into smaller cylindrical disk samples.

Preparation of AgNPs-Impregnated Cryogels

PSA/Ag cryogels were prepared using the intermatrix synthesis (IMS) method. Typically, 1 g of the dried PSA cryogels was allowed to swell in a 250 mL solution of 1, 5, or 10 mM of $AgNO_3$ (≥98% Merck). The suspension was shaken at 120 rpm on an orbital shaker for 24 h. The resultant swollen cryogels were washed several times with MilliQ water to remove the unbound $Ag^+$ ions on the surface. The cryogels were immersed in a 250 mL solution of $NaBH_4$ (Alfa Aesar, 10:1 molar ratio of $NaBH_4$ to $AgNO_3$) to form silver nanoparticles (AgNPs). The resultant nanocomposites were thoroughly washed by immersion in MilliQ water followed by vacuum filtration. After three repetitions of the washing step, the nanocomposites were dried using the same procedure that was used for the PSA cryogels.

Characterization of Cryogel Nanocomposites

X-ray diffraction (XRD) spectra were acquired using a powder X-ray diffractometer (Shimadzu 6000) with a monochromatic intensity Cu Kα radiation ($\lambda$=1.5418 Å) in a 2θ range of 5-80° at a scan rate of 1.5° $min^1$. X-ray photoelectron spectroscopy (XPS) studies were conducted on a Kratos Axis Ultra spectrometer with a monochromatic Kα excitation source (hv=1486.71 eV). The binding energies were calibrated using a C 1s core level at 284.8 eV as a reference. Field emission scanning microscope (FESEM, JEOL JSM-7600F) was used to image the morphology of the cryogel nanocomposites. The specimens were coated with Pt for 30 s (20 mA) using an auto-fine coater (JEOL JFC-1600) prior to imaging. An energy-dispersive X-ray spectroscopy detector (EDX) attached to the FESEM was used to determine the elemental composition of the nanocomposites. The morphology and size of the AgNPs were studied using a transmission electron miscroscope (TEM, Carl Zeiss Libra 120) at an accelerating voltage of 120 kV. TEM images were analyzed using image analysis software (ImageJ) to determine the particle-size distribution of the AgNPs. High-resolution TEM images of the AgNPs were obtained at an accelerating voltage of 200 kV (JEOL JEM-2010). UV-Vis absorption spectra of the nanocomposite solutions were obtained using a UV-Vis absorption spectrophotometer (Shimadzu UV-1700). The mechanical properties of the fully-swollen nanocomposites of 10 mm thickness were characterized using a computer-controlled mechanical testing system (Instron 5567) at room temperature. A 5 kN load cell at a ramp rate of 10 mm $min^{-1}$ was used and the sample was compressed up to 95% strain of its initial length. Five replicate experiments were conducted.

Antibacterial Tests

*Escherichia coli* (*E. coli*, ATCC® 25922™) and *Bacillus subtilis* (*B. subtilis*, ATCC® 6633™) were selected as the model gram-negative and -positive bacteria for the antibacterial tests. *E. coli* and *B. subtilis* were cultivated in tryptic soy broth and nutrient broth at 37 and 30° C., respectively, and were harvested after reaching their mid-exponential growth phase. The harvested cells were washed by centrifugation followed by resuspension in phosphate buffered saline (PBS, 0.01 M, pH=7.45). A 0.02 g cryogel sample was added into a 10 mL bacterial suspension of cell density $10^8$ colony forming units per mL (cfu $mL^{-1}$); manual shaking was provided during cryogel swelling in bacterial suspension. After 15 s of swelling in the bacterial suspension, the swollen cryogels were quickly removed and squeezed to obtain the treated water. Control experiments were conducted without adding any cryogel into the bacterial suspension. After appropriate dilution in PBS, 0.1 mL of the control, treated water, and bulk water were streaked on tryptic soy agar or nutrient agar followed by 24 h of incubation to enumerate the number of viable bacteria. At least 6 replicate experiments were conducted. The kinetics of bactericidal action was studied by using Universal Quenching Agent (0.1% peptone; 0.1% $Na_2S_2O_3$; 0.5% Tween 80, 0.07% lecithin) to quench the disinfection reaction. To quench the reaction, bacterial suspension was diluted 10 times in universal quenching agent (UQA).

Analytical Methods for Ag Determination

Total Ag loss (as $Ag^+$ ions and AgNPs) after a 24-h immersion in 10 mL of MilliQ water was determined by measuring the total Ag content in the resultant solution. Ag loss for each sample was expressed as a percentage of the total Ag in the fresh nanocomposite. All samples were digested in $HNO_3$ (67%, Merck) at 170° C. for 2 h on a digestor unit (Hach DRB 200) prior to total Ag analyses. The total Ag concentration in the samples was determined by using either an inductively coupled plasma-optical emission spectrophotometer (ICP-OES, Perkin Elmer Optima 2000DV) or an inductively coupled plasma-mass spectrometer (ICP-MS, Elan DRC-e) depending on the concentration range of the samples. Silver/sulfide solid state ion selective electrode (Thermo Scientific Orion) was used for determination of Ag as Ag+. All samples were buffered with ionic strength adjustor (ISA, Orion) before measurements. All glassware and storage bottles were soaked in 10% (v/v) $HNO_3$ for at least 24 h before use. Triplicate experiments were conducted.

Statistical Analyses

The statistical significance of the difference between the obtained results was determined using the Student's t test at a 95% confidence level. All measurements are reported as the mean±one standard deviation of at least three replicates.

Results and Discussion

Properties of PSA/Ag Cryogel Nanocomposites

Figure 1:
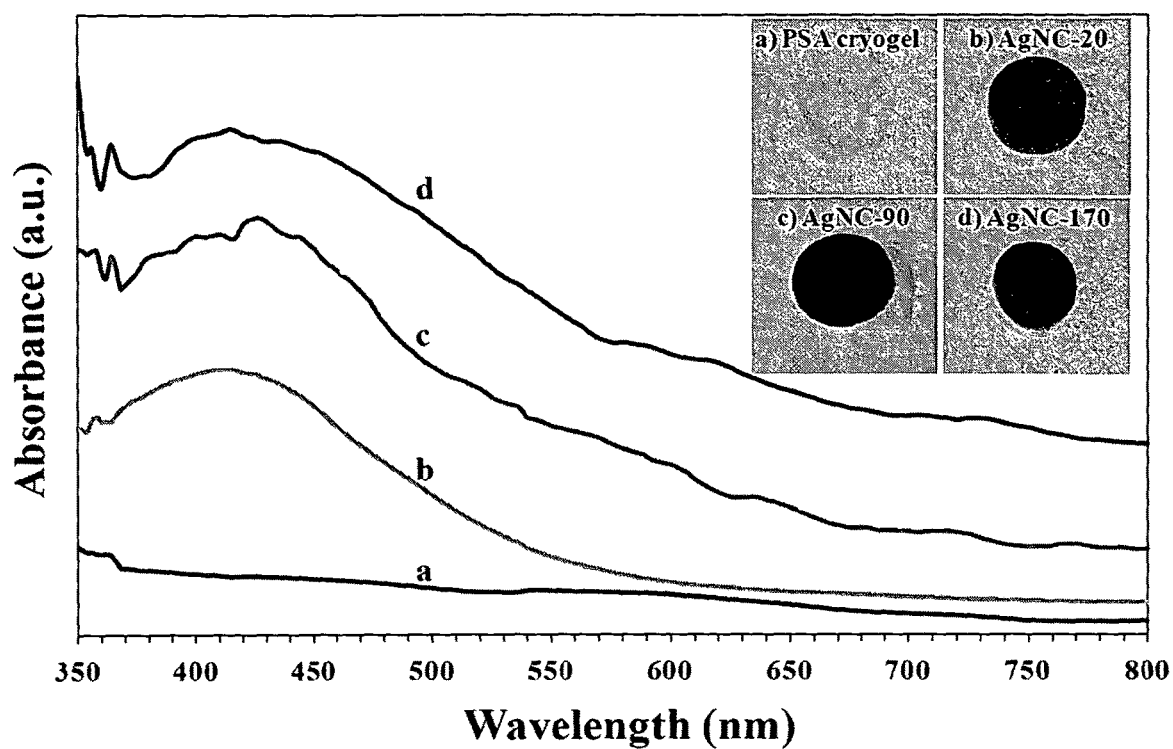
FIG. 1 shows UV-visible absorption spectra of PSA/Ag cryogels with different Ag loadings. The inset shows the photographs of the as-synthesized cryogel nanocomposites.

PSA/Ag cryogels were prepared by reduction of $Ag^+$ ions stabilized in preformed PSA cryogels using $NaBH_4$ as the reductant. Upon borohydride reduction, the cryogels changed color from white to dark brown (inset of FIG. 1). The dark brown color was due to the surface plasmon resonance of AgNPs as evidenced by the characteristic absorption peak in the vicinity of 420-430 nm (FIG. 1). The Ag content in the nanocomposites ranged from 20 to 170 mg $g^{-1}$ (FIG. 2). The increase of the Ag content in the nanocomposites correlates well to the increase of the precursor $AgNO_3$ concentration used (FIG. 2, $R^2$>0.99). The concentration of Ag in the cryogel nanocomposites was relatively high indicating that the PSA cryogels are suitable matrices for stabilizing AgNPs. Hereafter, the as-synthesized PSA/Ag cryogel nanocomposites were denoted as AgNC-x, where x (x=20, 90, and 170) represents the Ag content (mg $g^{-1}$) in the nanocomposites.

Ion-exchange reaction between Na+ and Ag+ ions:

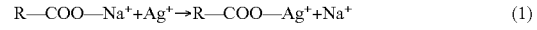

$$R—COO—Na^+ + Ag^+ \rightarrow R—COO—Ag^+ + Na^+ \qquad (1)$$

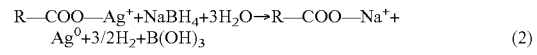

$$R—COO—Ag^+ + NaBH_4 + 3H_2O \rightarrow R—COO—Na^+ + Ag^0 + 3/2H_2 + B(OH)_3 \qquad (2)$$

Figure 3:
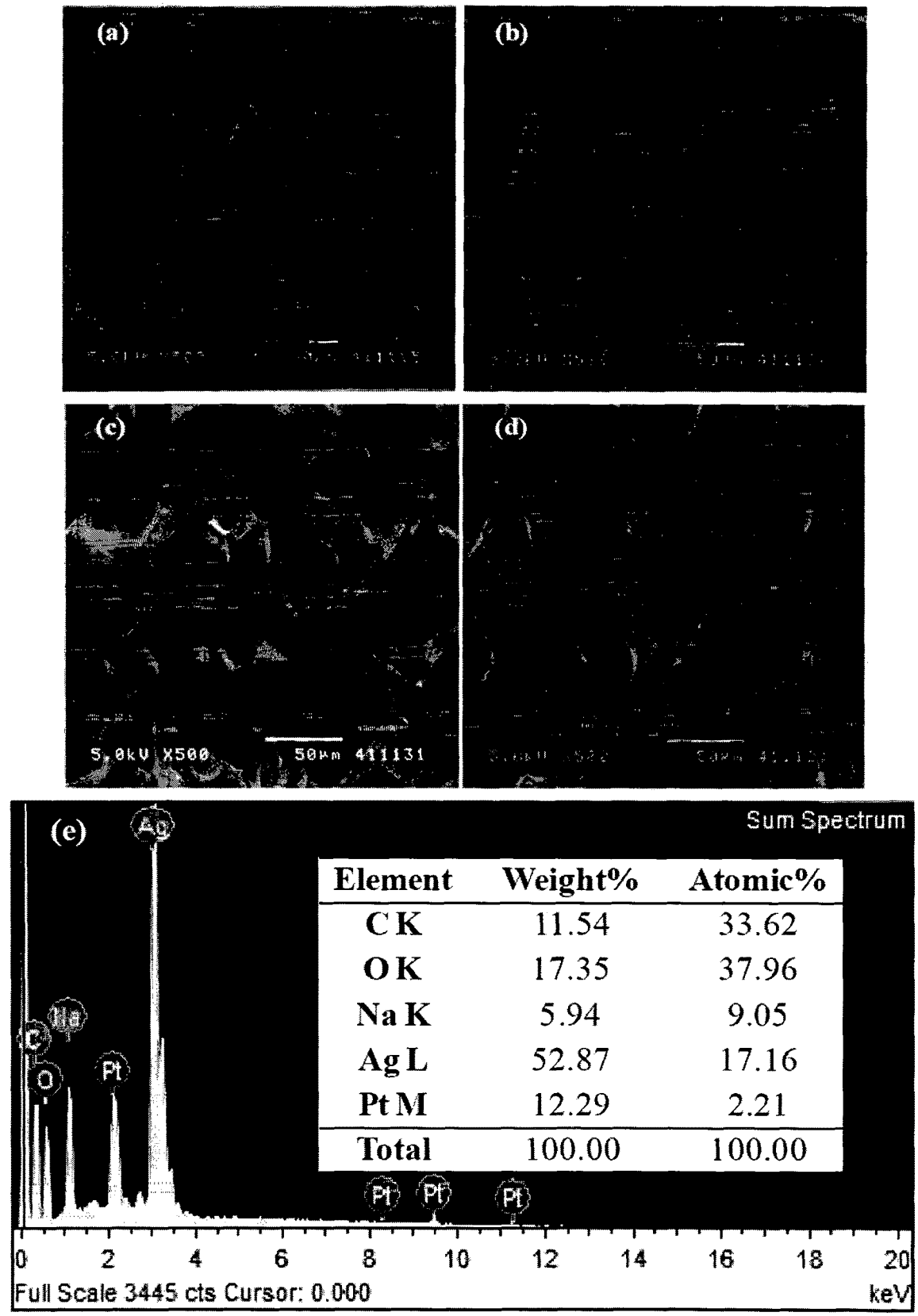
FIG. 3 shows SEM images of (a) PSA cryogels, (b) AgNC-20, (c) AgNC-90, (d) AgNC-170, (e) EDX spectrum of a selected spot on the SEM image of AgNC-170.

The progress of this reaction is as shown in FIG. 3. PSA cryogels had a relatively high ion exchange capacity, i.e., 9.0±0.8 meq/g, due to the presence of numerous —COO— groups. It has been reported that the IMS could form materials with high Ag contents.

Figure 4:
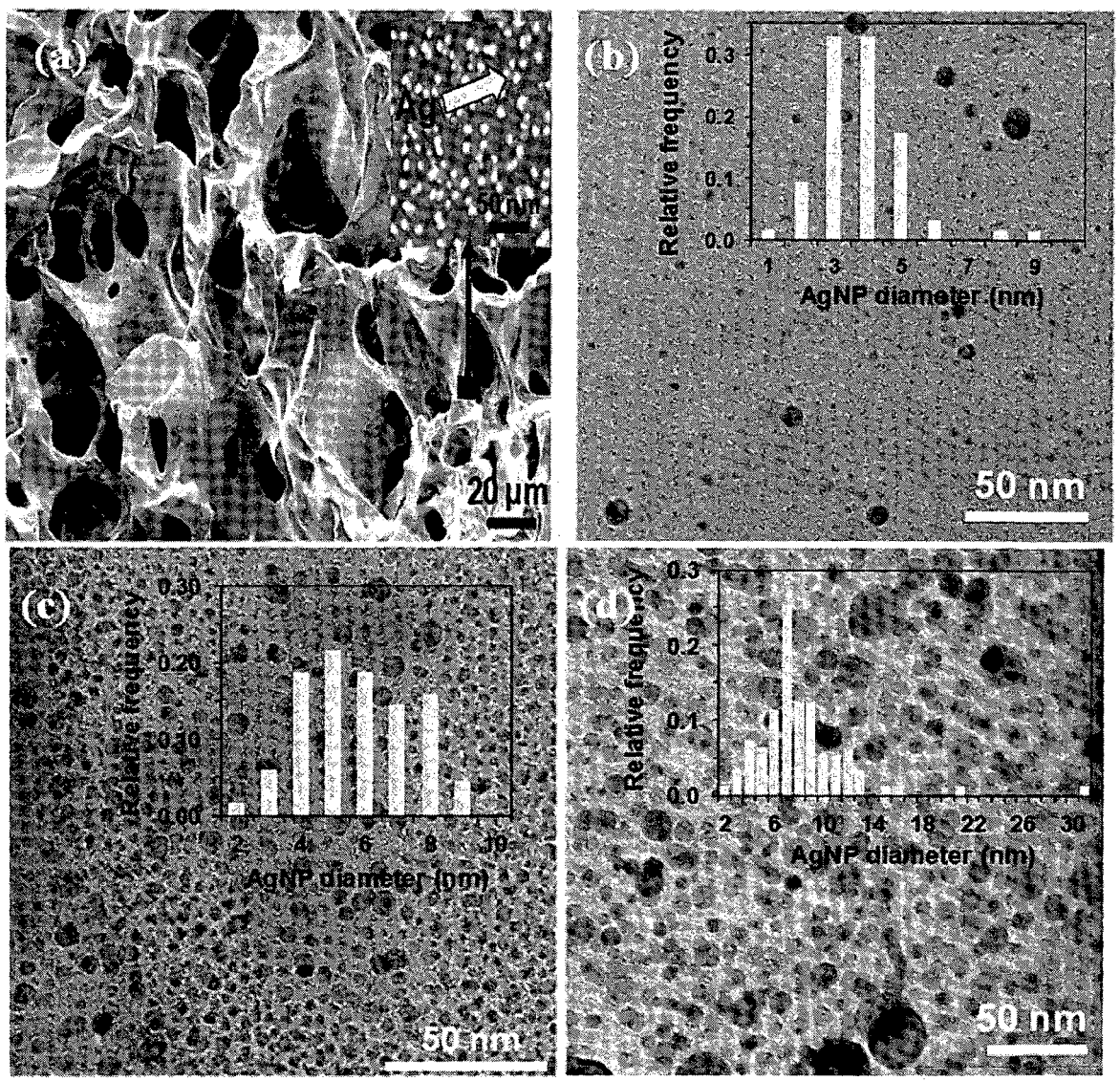
FIG. 4 shows (a) FESEM image of AgNC-170 under a low magnification; the inset shows a high-magnification FESEM image of AgNPs dispersed on the pore surface of AgNC-170; the AgNPs-size distribution and TEM images of the AgNPs in (b) AgNC-20, (c) AgNC-90, and (d) AgNC-170.

The FESEM images show that the pore size and interconnectivity of the cryogels was relatively unaffected after AgNPs decoration (FIG. 4a and FIG. 3). This is because of the large difference in the scale of the cryogel pores (1-100 µm) and AgNPs (mostly <10 nm). Bright spots that appeared like studs on the surface of cryogel pore walls were evident under a higher magnification (FIG. 4a, inset), showing that the AgNPs were very well dispersed in the cryogel network. The good dispersion may be attributed to electrosteric stabilization of AgNPs in the PSA cryogels. Furthermore, the highly crosslinked polymeric network of PSA provided random confinement of AgNPs growth in the free volumes between the networks forming particles that are mostly <10 nm (FIG. 4b-d). Also, the average AgNP size, and the size distribution were found to increase slightly with Ag content (FIG. 2, FIG. 4b-d). It should be noted that the AgNPs sizes derived from TEM images are in good agreement with the average Ag crystallite sizes determined from XRD (FIG. 2). The good dispersion of fine AgNPs combined with the highly interconnected porous network of PSA cryogel is anticipated to increase the probability of collisional contact with bacterial cells that would lead to high disinfection efficacies.

XPS analyses were conducted to ascertain the chemical states of Ag in the cryogel nanocomposites. FIG. 5a shows the high-resolution XPS spectra at the Ag 3d core level of the PSA/Ag cryogels. Distinct doublet peaks centered at 367.6 and 373.6 eV, which are the peaks for Ag $3d_{3/2}$ and Ag $3d_{5/2}$, respectively, were observed. A spin-orbit splitting energy of 6.0 eV for the 3d doublet of Ag indicates the formation of metallic AgNPs. Furthermore, FIG. 5b shows that the three nanocomposites had diffraction peaks at $2\theta$ angles of 38.1, 44.3, 64.5, and 77.4°, which are the characteristic peaks of face-centered-cubic Ag (JCPDS card no. 4-783). The major crystal plane in the nanocomposites was (111), a high atom density facet, which has been found to be highly effective for disinfection (FIG. 5b). The selected area electron diffraction (SAED) pattern confirms the results from XRD analyses (FIG. 5d). The lattice spacing of major crystal planes can be observed in the high-resolution transmission electron (HRTEM) images of the AgNPs (FIG. 5c).

Figure 6:
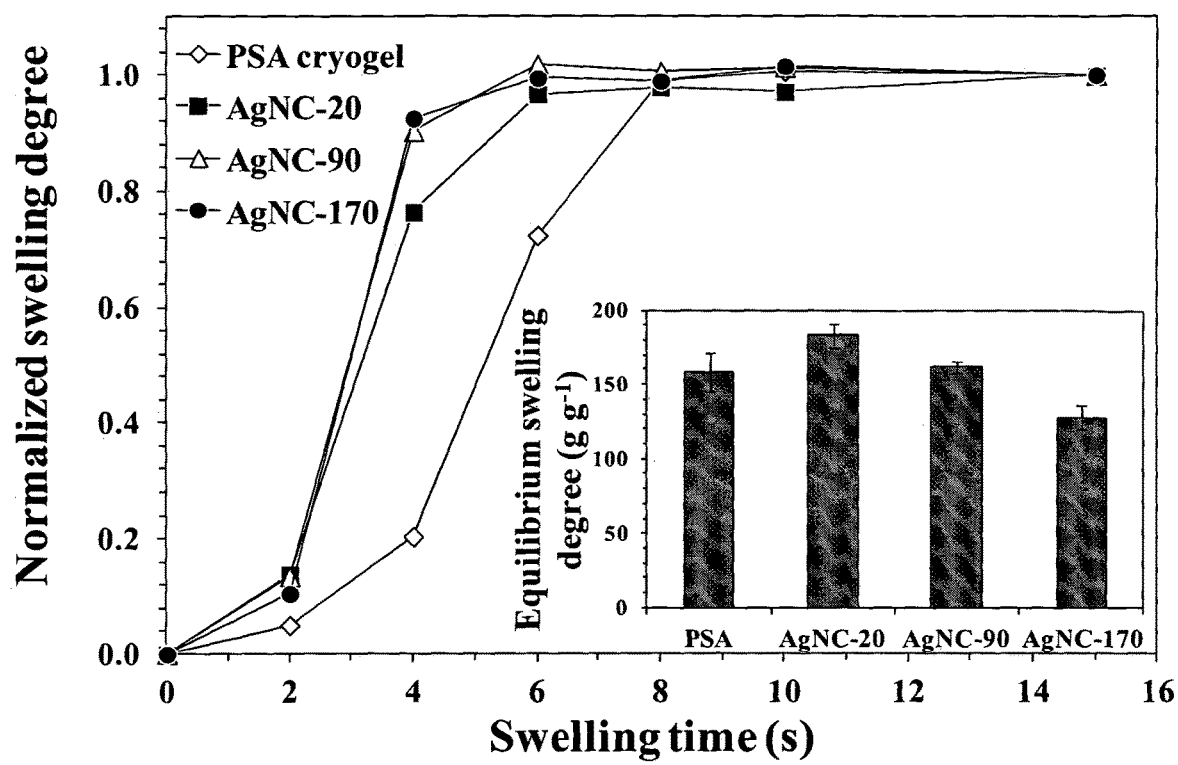
FIG. 6 shows dynamic swelling profiles of cryogels. The swelling degrees were normalized with respected to their respective equilibrium swelling degrees, which are shown in the inset.

FIG. 6 shows the dynamic swelling profile of PSA/Ag cryogels. The nanocomposites took less than 10 s to reach their equilibrium swollen state (FIG. 6). As shown in FIG. 2, an increase in the Ag loading generally led to a decrease in the swelling degree of the nanocomposites as a result of an increase in the non-swellable component (Ag). However, this effect may be less important at low Ag loading as AgNC-20 had a higher swelling degree than that of PSA cryogel. The enhanced swelling degree at low Ag loading may be ascribed to increased permeability of the cryogel network as a result of the interaction between electron-dense AgNPs that causes free volume expansion. This also explains the higher swelling rate of PSA/Ag cryogels loaded with a higher Ag content (FIG. 6).

Figure 7:
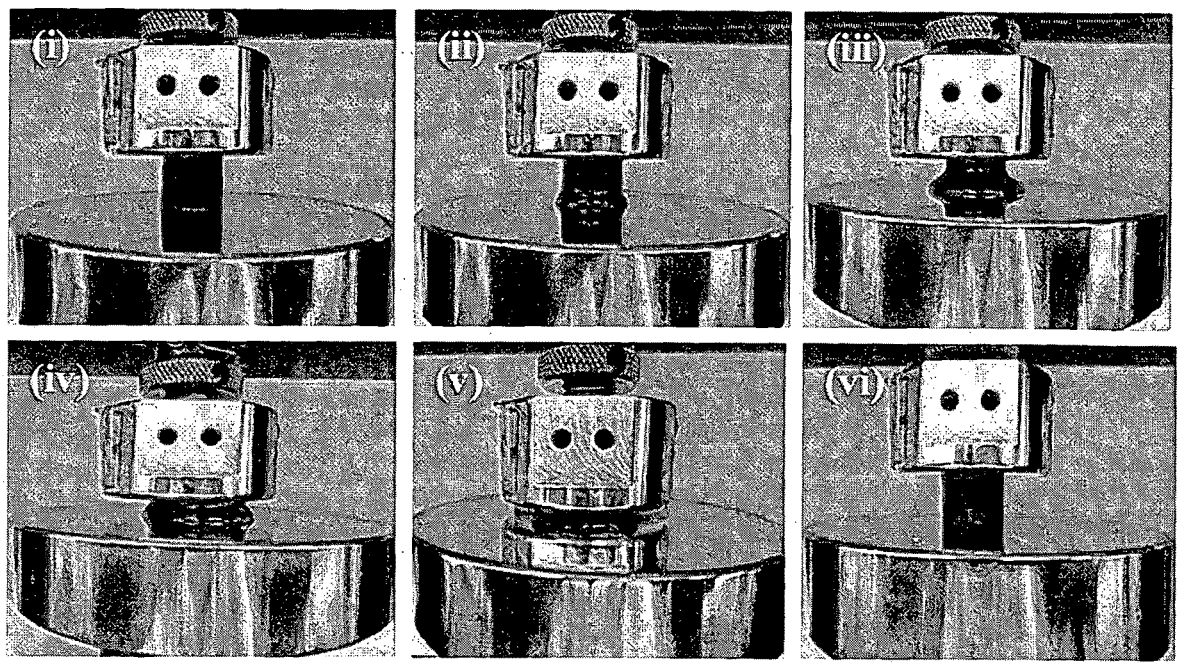
FIG. 7 shows photographs taken during compression tests of PSA/Ag cryogel.
Figure 8:
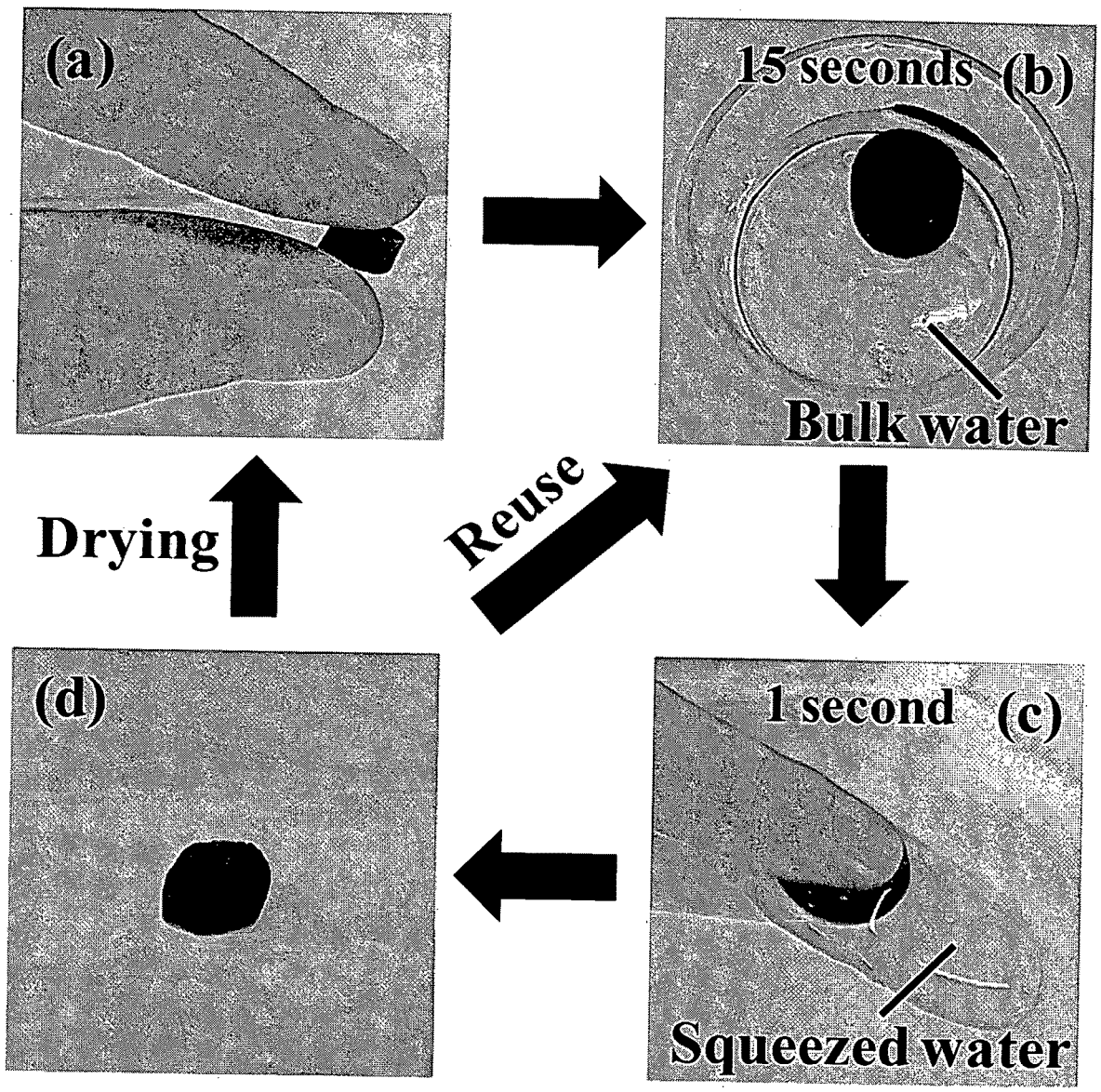
FIG. 8 shows photographs depicting present approach of using PSA/Ag cryogels for water disinfection: (a) dried PSA/Ag cryogel, (b) swelling of PSA/Ag cryogel in contaminated water, (c) recovery of treated water via hand compression, and (d) deswollen PSA/Ag cryogel.

PSA cryogels loaded with AgNPs not only showed better swelling behavior but also showed improved mechanical properties. None of the PSA/Ag cryogels synthesized in this study failed at the end of the compression test (FIG. 2 and FIG. 7). Moreover, AgNPs loading into the PSA cryogels further improved their mechanical properties since it resulted in stronger and more rigid nanocomposites as indicated by the increase in the Young's modulus (FIG. 2). The water recovery efficiencies of PSA/Ag cryogels were not compromised as a result of their excellent mechanical properties and high pore-interconnectivity. About 85% of the absorbed water could be recovered via low-pressure vacuum filtration (FIG. 2). Alternatively, the absorbed water could be recovered by manual hand squeezing (FIG. 8c). The remarkable mechanical and swelling-deswelling properties of PSA/Ag cryogels motivate us to propose a novel process, as shown in FIG. 8, in which PSA/Ag cryogels can be used to disinfect water.

Ag Release into Treated Water

A particular issue with the use of AgNPs as antimicrobial agents is potential release of significant levels of Ag into the treated water that may occur via (i) uncontrolled dissolution of AgNPs into water in the form of $Ag^+$ ions, and (ii) dislodgement of AgNPs from the polymer matrix. Significant Ag release into the treated water is undesirable since it may reduce the reusability of the nanocomposites and pose health risks. The PSA/Ag cryogels displayed excellent stability because the total Ag loss after a 24-h Ag-release test was lower than 2% (FIG. 2). The coordination capacity of the carboxylate groups (—$COO^-$) in PSA is responsible for anchoring the fine AgNPs within its network that resulted in the high stability of PSA/Ag cryogels. PSA has been shown to be an effective stabilizing agent for AgNPs. Furthermore, excess $Ag^+$ ions released from AgNPs can be efficiently captured by the free —$COO^-$ functionalities in PSA/Ag cryogels. As a consequence, the concentration of total Ag in the squeezed water did not exceed 100 µg $L^{-1}$, the WHO's recommended limit for total Ag concentration in drinking water.

Disinfection Efficacies of the Cryogel Nanocomposites

The PSA/Ag cryogels synthesized in this study showed excellent disinfection of both E. coli and B. subtilis; they showed a 5.4-7.0 log reduction of viable bacteria in the squeezed water after swelling in bacterial suspension for 15 s (FIG. 9a). It should be noted that even the PSA/Ag cryogels having the lowest Ag content (i.e., AgNC-20) could deactivate more than 5 logs of viable bacteria (FIG. 9a). B. subtilis was deactivated to a greater extent than E. coli that is in agreement with the findings of other studies. Unmodified PSA cryogels could remove some bacteria possibly due to (i) bacterial exclusion by smaller pores, (ii) bacterial entrapment in blind pores, and/or (iii) deposition of bacterial cells on the interior surface of cryogel during compression (FIG. 9a). However, the extent of reduction was marginal when compared with that of the PSA/Ag cryogels. The PSA/Ag cryogels were also highly reusable as indicated by the relatively consistent log reduction values (LRVs) over five cycles of operation (FIG. 9b). The LRVs were not statistically different between the five operational cycles (p-value >0.05). The good reusability of PSA/Ag cryogels may be attributed to the high stability of AgNPs in PSA cryogel matrices.

AgNC-170 was selected for bactericidal kinetic study due its excellent disinfection efficacy and minimal Ag release. UQA was added immediately after the absorbed water was squeezed to neutralize Ag.

The mechanisms by which free AgNPs exert toxicity have been studied; however, there is no general consensus as to whether the toxicity of the AgNPs was due to release of $Ag^+$ ions or to intrinsic properties specific to the particle (primarily $Ag^0$). $Ag^+$ ions are toxic to bacteria due to various mechanisms including binding to thiols in proteins and disrupting the bacterial respiratory chain, thereby generating reactive oxygen species (ROS) that can lead to oxidative stress and cell damage. On the other hand, the toxicity effects of AgNPs have been suggested to arise from: (i)

physical processes that involve disruption of the cell membrane and/or penetration of AgNPs into the cell, (ii) particle surface reactions that generate ROS, which catalyzes the oxidation of cellular contents, and/or (iii) direct interaction with enzyme sites that changes the conformation resulting in impaired metabolism.

The bactericidal mechanism of bulk materials functionalized with AgNPs is rarely discussed in the literature. Present inventors hypothesize that the biocidal action of PSA/Ag cryogels is dominated by surface-controlled mechanisms that are dependent on direct contact of the interface of the PSA/Ag cryogels with the bacterial cells. This is supported by the fact that PSA/Ag cryogels showed a significantly higher disinfection of the squeezed water than that of the bulk water (p-value <0.05, FIG. 8c). This indicates that the bacterial cells need to come into close contact with PSA/Ag cryogels to significantly reduce their viability. The large difference in the LRVs between the bulk and squeezed waters would not have been observed if the $Ag^+$ ions in the solution were responsible for bacterial deactivation (FIG. 9c). The concentrations of $Ag^+$ (and toxicity levels) in the bulk and squeezed waters should be the same, since the $Ag^+$ released can efficiently diffuse from the porous PSA/Ag cryogels into the solution (both absorbed and bulk waters). It has been shown that the diffusion rate of $Ag^+$ ions (released from AgNPs) through a dialysis membrane is faster than its dissolution from the AgNPs.

Figure 10:
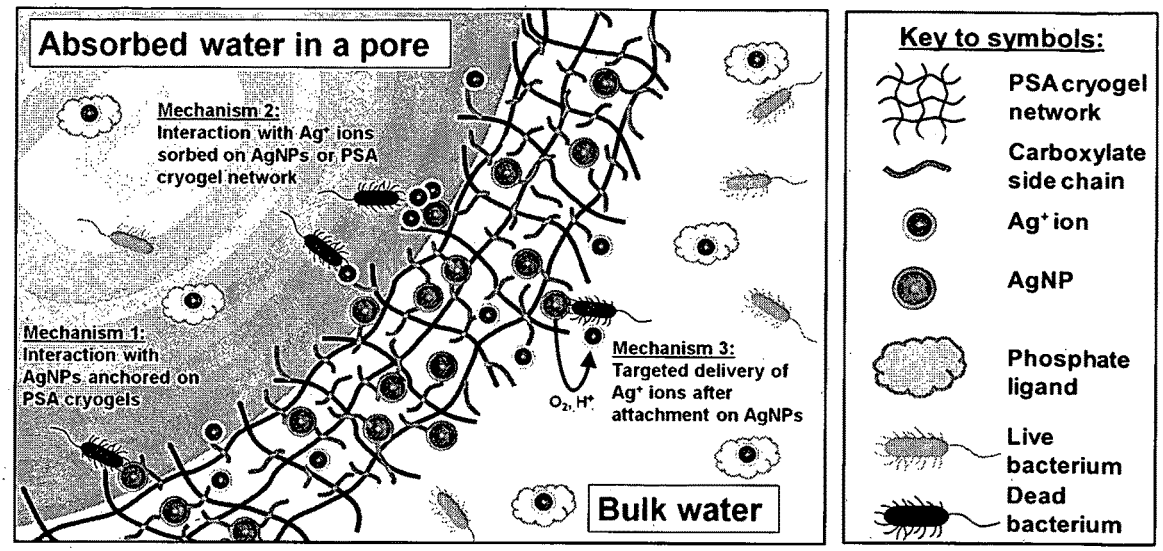
FIG. 10 shows an illustration that summarizes the possible mechanisms of biocidal action of PSA/Ag cryogel nanocomposites.

FIG. 10 summarizes present hypothetical toxicity pathways of PSA/Ag cryogels to the bacterial cells. It is envisaged that the water-absorbing cryogels bring water and bioactive Ag species into close proximity for disinfection to take effect within the micron-sized pore spaces, which are densely decorated with AgNPs. On this note, disinfection may occur via several mechanisms. One possible mechanism involves direct contact between the bacterial cells and the AgNPs anchored on the PSA cryogels (Mechanism 1 in FIG. 10). Another plausible mechanism involves $Ag^+$ ions that are associated with the PSA/Ag cryogels via chemical/physical sorption on the surface of the AgNPs or the PSA cryogel network (Mechanism 2 in FIG. 10). Note that there is evidence that $Ag^+$ ions can be chemisorbed on the AgNP surface. In addition, present cryogels contained O and (to a lesser extent) N functional groups that can bind $Ag^+$ ions. Such polymeric materials can control the release of bound $Ag^+$ ions via a reversible adsorption-desorption mechanism. PSA/Ag cryogels with $Ag^+$ ions bound to their polymeric network or to the AgNP surface can associate directly with the bacterial cells in close proximity to provide a targeted delivery of $Ag^+$ ions directly to the bacteria. Targeted delivery of $Ag^+$ ions may also occur via oxidative dissolution of $Ag^0$ after attachment of the AgNPs to biomolecules on the bacterial cells (Mechanism 3 in FIG. 10). The exact biocidal mechanism(s) of PSA/Ag cryogels are still debatable; thus, a detailed investigation needs to be carried out to elucidate their toxicity pathway(s). Nevertheless, based on the proposed mechanisms some insights can be drawn regarding the remarkable disinfection properties. On the basis of the proposed mechanisms it is reasonable to deduce that a large number of fine and well-dispersed AgNPs anchored on PSA cryogel surface combined with the highly porous network of PSA cryogels (bound with $Ag^+$ ions) provided a high surface area of bioactive Ag species exposed to bacterial cells in close proximity contributed to the rapid disinfection of the absorbed water. In addition, the ability of cryogels to rapidly absorb water also contributed to the fast disinfection. Besides bringing the bacterial suspension into close contact with the biocidal Ag species located on the pore surfaces, the fast water absorption ability of cryogels also played a crucial role in exposing the bacterial suspension to Ag species in a timely manner to allow rapid disinfection.

The ability of PSA/Ag cryogels to achieve more than a 5-log reduction of viable bacteria within a brief 5 min (tentatively) contact time is remarkable. In addition, few PSA/Ag cryogels is required to produce a reasonable amount of disinfected water due to its substantial water absorption and high disinfection efficacy. For instance, 4 g of AgNC-170 are sufficient to rapidly produce 500 mL of disinfected drinking water in one cycle of operation. Furthermore, they are highly reusable due to their high elasticity and stability of the AgNPs. Present inventors have previously demonstrated that PSA cryogels can withstand more than 20 cycles of swelling/deswelling without any mechanical degradation. They can also significantly improve the visual quality of the water due to substantial removal of particulates. The treated water can then be efficiently recovered via manual hand compression. Therefore, it is believed that the PSA/Ag cryogels prepared in this study may offer a simple approach for drinking-water disinfection in disaster-relief applications. In addition, the PSA/Ag cryogels prepared in this study are lightweight and highly portable allowing it to be easily deployed for emergency response.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The content of all documents and patent documents cited herein is incorporated by reference in their entirety.

The invention claimed is:

1. A method of preparing an antibacterial cryogel, the method comprising:
   immersing a non-swollen cryogel in a first solution comprising a precursor of an antibacterial agent to form a swollen modified cryogel, wherein the swollen modified cryogel comprises a polymeric cryogel matrix and the precursor of the antibacterial agent incorporated therein, wherein the non-swollen cryogel comprises polysodium acrylate (PSA); and
   removing the swollen modified cryogel from the first solution and immersing the swollen modified cryogel in a second solution comprising a reducing agent to reduce the precursor of the antibacterial agent to an antibacterial agent.

2. The method according to claim 1, wherein the precursor of the antibacterial agent and the antibacterial agent are nanoparticles.

3. The method according to claim 2, wherein the antibacterial agent nanoparticles comprise a metal, metal ion, metal oxide, sulfobetaine methacrylate, a peptide, a protein, or a polypeptide.

4. The method according to claim 3, wherein the antibacterial agent nanoparticles comprise silver (Ag), silver ions ($AG^+$), copper (Cu), copper (II) oxide (CuO), titanium dioxide ($TiO_2$), or zinc oxide (ZnO).

5. The method according to claim 1, wherein the precursor of the antibacterial agent is selected from the group consisting of silver acetate, silver fluoride, silver sulfate, and silver nitrate.

6. The method according to claim 1, wherein the reducing agent is selected from the group consisting of sodium borohydride ($NaBH_4$), citric acid, hydrazine, and ascorbic acid.

7. A method of disinfecting drinking water for point-of-use application, comprising:
   immersing the antibacterial cryogel prepared by the method of claim 1 in contaminated water to allow the antibacterial cryogel to swell; and
   squeezing the swollen antibacterial cryogel to release water therefrom.

8. The method according to claim 7, further comprising drying the antibacterial cryogel for re-use.

9. A method of preparing an antibacterial porous hydrogel, the method comprising:
   introducing pore forming agents during polymerization of monomers to form a non-swollen porous hydrogel, wherein the non-swollen porous hydrogel comprises polysodium acrylate (PSA);
   immersing the non-swollen porous hydrogel in a first solution comprising a precursor of an antibacterial agent to form a swollen modified porous hydrogel, wherein the swollen modified porous hydrogel comprises a porous polymeric hydrogel matrix and the precursor of the antibacterial agent incorporated therein; and
   removing the swollen modified porous hydrogel from the first solution and immersing the swollen modified porous hydrogel in a second solution comprising a reducing agent to reduce the precursor of the antibacterial agent to an antibacterial agent.

10. A method of disinfecting drinking water for point-of-use application, comprising:
    immersing the antibacterial porous hydrogel prepared by the method of claim 9 in contaminated water to allow the antibacterial porous hydrogel to swell; and
    squeezing the swollen antibacterial porous hydrogel to release water therefrom.

* * * * *